United States Patent
Li et al.

(10) Patent No.: US 11,272,489 B2
(45) Date of Patent: Mar. 8, 2022

(54) METHOD AND APPARATUS OF HANDLING DEVICE-TO-DEVICE RESOURCE POOL WITHOUT PHYSICAL SIDELINK FEEDBACK CHANNEL IN A WIRELESS COMMUNICATION SYSTEM

(71) Applicant: ASUSTek Computer Inc., Taipei (TW)

(72) Inventors: Ming-Che Li, Taipei (TW); Li-Chih Tseng, Taipei (TW); Chun-Wei Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/104,627

(22) Filed: Nov. 25, 2020

(65) Prior Publication Data

US 2021/0168790 A1    Jun. 3, 2021

Related U.S. Application Data

(60) Provisional application No. 62/942,937, filed on Dec. 3, 2019.

(51) Int. Cl.
| | |
|---|---|
| *H04W 4/00* | (2018.01) |
| *H04W 72/04* | (2009.01) |
| *H04L 1/18* | (2006.01) |
| *H04W 72/14* | (2009.01) |

(52) U.S. Cl.
CPC ....... *H04W 72/0413* (2013.01); *H04L 1/1812* (2013.01); *H04W 72/042* (2013.01); *H04W 72/14* (2013.01)

(58) Field of Classification Search
CPC ............... H04W 72/14; H04W 72/042; H04W 72/0413; H04W 72/1812
See application file for complete search history.

(56) References Cited

U.S. PATENT DOCUMENTS

| | | | |
|---|---|---|---|
| 2015/0365518 A1* | 12/2015 | Wu | H04L 67/36 455/552.1 |
| 2016/0278053 A1* | 9/2016 | Lee | H04W 8/005 |
| 2020/0029318 A1* | 1/2020 | Guo | H04L 1/1822 |
| 2021/0076236 A1* | 3/2021 | Kimura | H04W 4/40 |

* cited by examiner

*Primary Examiner* — Bo Hui A Zhu
(74) *Attorney, Agent, or Firm* — Skaar Ulbrich Macari, P.A.

(57) ABSTRACT

A method and apparatus are disclosed from the perspective of a first device. In one embodiment, the method includes the first device receiving a configuration, from a network node, of a first sidelink resource pool without any Physical Sidelink Feedback Channel (PSFCH) resource. The method further includes the first device receiving a first sidelink grant transmitted, configured, or scheduled by the network node, wherein the first sidelink grant schedules or indicates at least a first sidelink resource in the first sidelink resource pool. Furthermore, the method includes the first device expecting or considering that the first sidelink grant provides no Physical Uplink Control Channel (PUCCH) resource for reporting Sidelink (SL) Hybrid Automatic Repeat Request (HARQ) feedback.

20 Claims, 9 Drawing Sheets

| DCI format | Search Space |
|---|---|
| DCI format 5 | For PDCCH: Common and UE specific by C-RNTI<br>For EPDCCH: UE specific by C-RNTI |

FIG. 5 (PRIOR ART)

| DCI format | Search Space |
|---|---|
| DCI format 5A | For PDCCH: Common and UE specific by C-RNTI<br>For EPDCCH: UE specific by C-RNTI |

FIG. 6 (PRIOR ART)

| SL index field in DCI format 5A | Indicated value $m$ |
|---|---|
| '00' | 0 |
| '01' | 1 |
| '10' | 2 |
| '11' | 3 |

FIG. 7 (PRIOR ART)

| Resource reservation field in SCI format 1 | Indicated value X | Condition |
|---|---|---|
| '0001', '0010', ..., '1010' | Decimal equivalent of the field | The higher layer decides to keep the resource for the transmission of the next transport block and the value X meets $1 \leq X \leq 10$. |
| '1011' | 0.5 | The higher layer decides to keep the resource for the transmission of the next transport block and the value X is 0.5. |
| '1100' | 0.2 | The higher layer decides to keep the resource for the transmission of the next transport block and the value X is 0.2. |
| '0000' | 0 | The higher layer decides not to keep the resource for the transmission of the next transport block. |
| '1101', '1110', '1111' | Reserved | |

FIG. 8 (PRIOR ART)

METHOD AND APPARATUS OF HANDLING DEVICE-TO-DEVICE RESOURCE POOL WITHOUT PHYSICAL SIDELINK FEEDBACK CHANNEL IN A WIRELESS COMMUNICATION SYSTEM

CROSS-REFERENCE TO RELATED APPLICATIONS

The present Application claims the benefit of U.S. Provisional Patent Application Ser. No. 62/942,937 filed on Dec. 3, 2019, the entire disclosure of which is incorporated herein in their entirety by reference.

FIELD

This disclosure generally relates to wireless communication networks, and more particularly, to a method and apparatus of handling device-to-device resource pool without physical sidelink feedback channel in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a first device. In one embodiment, the method includes the first device receiving a configuration, from a network node, of a first sidelink resource pool without any Physical Sidelink Feedback Channel (PSFCH) resource. The method further includes the first device receiving a first sidelink grant transmitted, configured, or scheduled by the network node, wherein the first sidelink grant schedules or indicates at least a first sidelink resource in the first sidelink resource pool. Furthermore, the method includes the first device expecting or considering that the first sidelink grant provides no Physical Uplink Control Channel (PUCCH) resource for reporting Sidelink (SL) Hybrid Automatic Repeat Request (HARQ) feedback.

BRIEF DESCRIPTION OF THE DRAWINGS

FIG. 5 is a reproduction of Table 14.2-1 of 3GPP TS 36.213 V15.4.0.

FIG. 6 is a reproduction of Table 14.2-2 of 3GPP TS 36.213 V15.4.0.

FIG. 7 is a reproduction of Table 14.2.1-1 of 3GPP TS 36.213 V15.4.0.

FIG. 8 is a reproduction of Table 14.2.1-2 of 3GPP TS 36.213 V15.4.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.213 V15.4.0 (2018-12), "E-UTRA; Physical layer procedures (Release 15)"; TS 36.212 V15.4.0 (2018-12), "E-UTRA); Physical layer; Multiplexing and channel coding (Release 15)"; TS 36.211 V15.4.0 (2018-12), "E-UTRA); Physical layer; Physical channels and modulation (Release 15)"; RP-191723, "Revised WID on 5G V2X with NR sidelink", LG Electronics; R1-1810051, "Final Report of 3GPP TSG RAN WG1 #94 v1.0.0 (Gothenburg, Sweden, 20th-24th Aug. 2018)"; R1-1812101, "Final Report of 3GPP TSG RAN WG1 #94bis v1.0.0 (Chengdu, China, 8th-12h Oct. 2018)"; R1-1901482, "Final Report of 3GPP TSG RAN WG1 #95 v0.1.0 (Spokane, USA, 12th-16h Nov. 2018)"; R1-1901483, "Final Report of 3GPP TSG RAN WG1 #AH_1901 v1.0.0 (Taipei, Taiwan, 21st-25th Jan. 2019)"; R1-1905837, "Final Report of 3GPP TSG RAN WG1 #96 v2.0.0 (Athens, Greece, 25th Feb.-1st Mar. 2019)"; R1-1905921, "Final Report of 3GPP TSG RAN WG1 #96bis v1.0.0 (Xi'an, China, 8th-12th Apr. 2019)"; R1-1907973, "Final Report of 3GPP TSG RAN WG1 #97 v1.0.0 (Reno, USA, 13th-17th May 2019)"; R1-1909942, "Final Report of 3GPP TSG RAN WG1 #98 v1.0.0 (Prague, Czech Rep, 26th-30th Aug. 2019)"; R1-1913275, "Final Report of 3GPP TSG RAN WG1 #98bis v2.0.0 (Chongqing, China, 14th-20th Oct. 2019)"; Draft Report of 3GPP TSG RAN WG1 #99 (Reno, USA, 18th-22nd Nov. 2019). The standards and documents listed above are hereby expressly incorporated by reference in their entirety.

Figure 1:
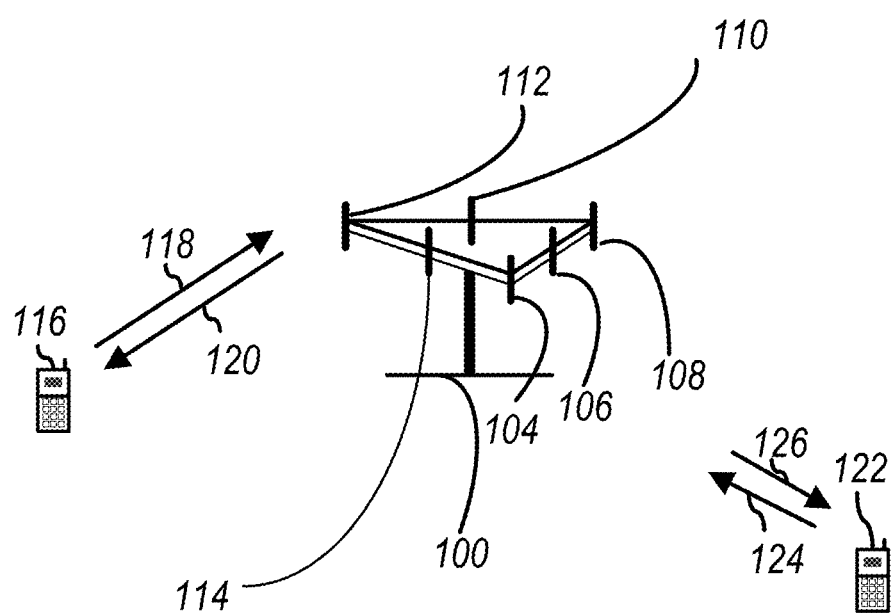
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
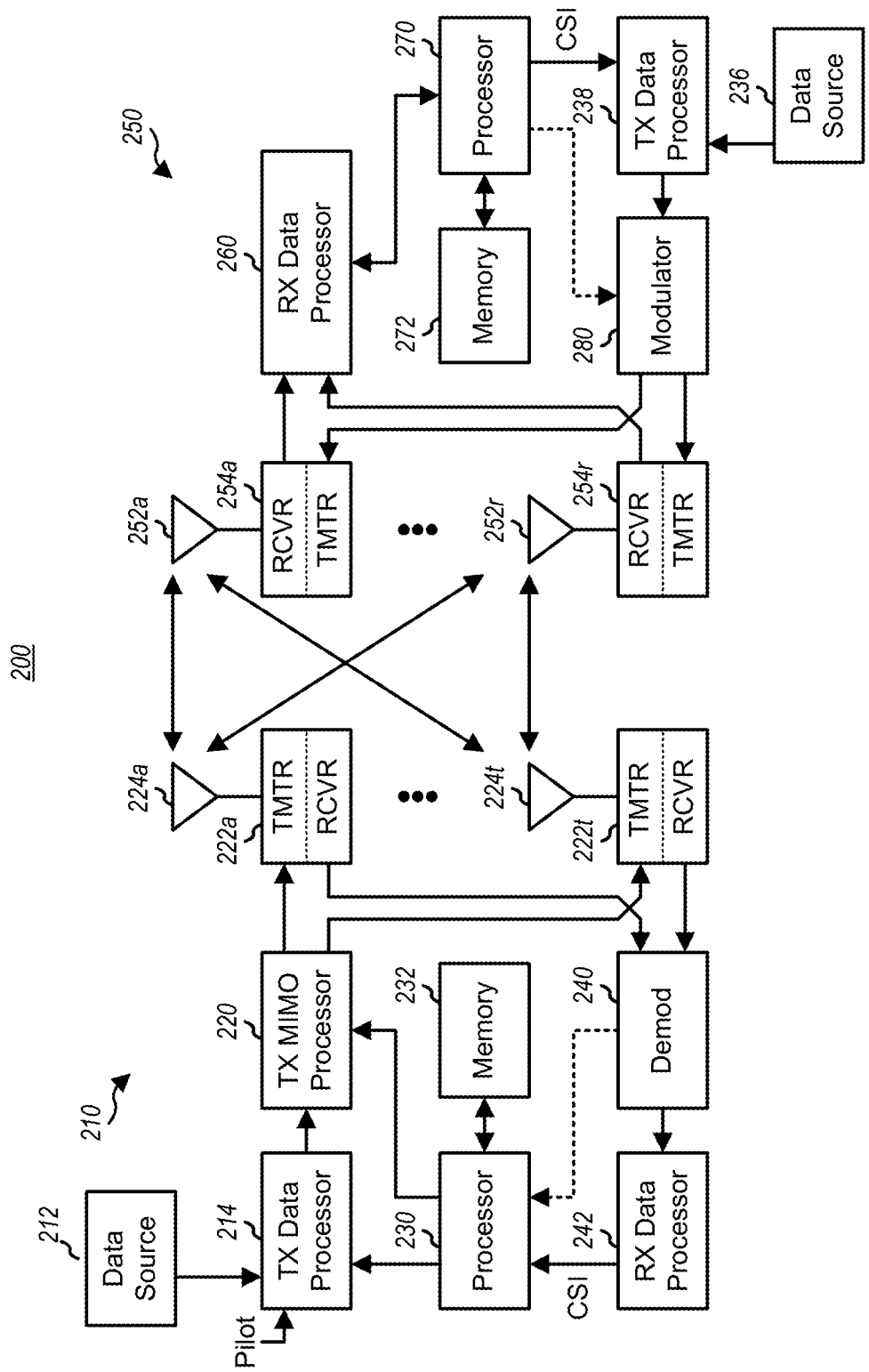
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
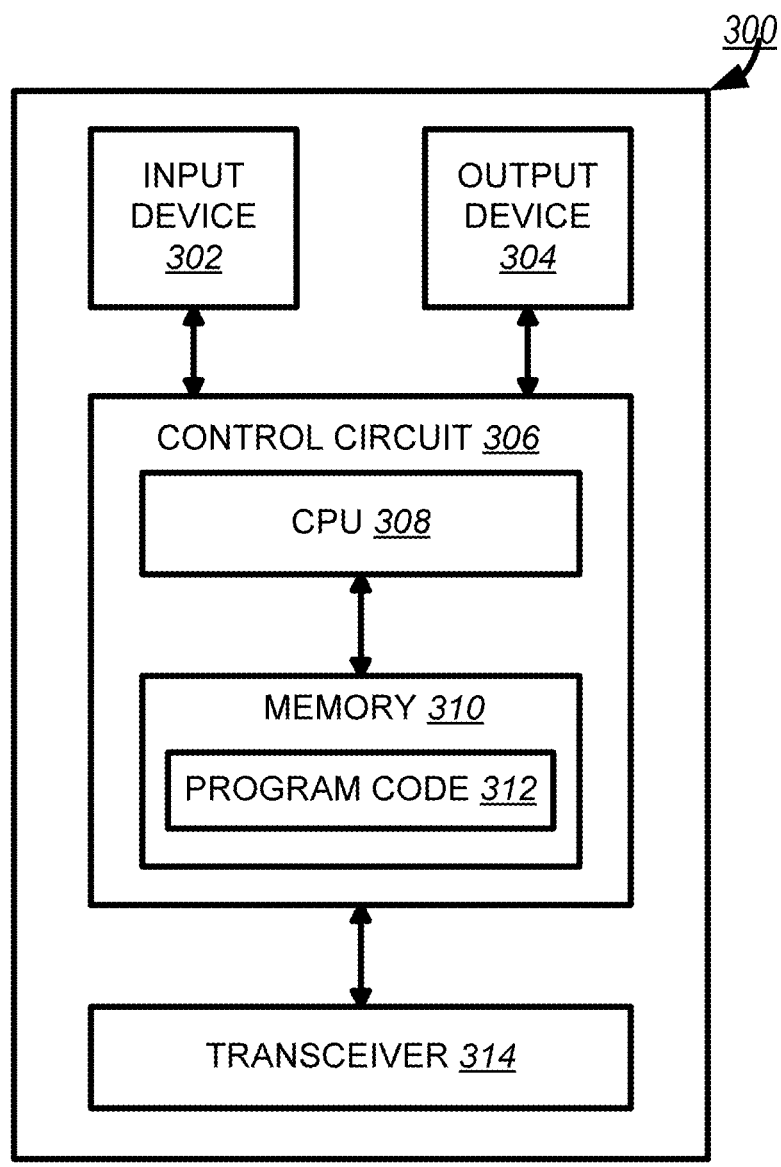
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
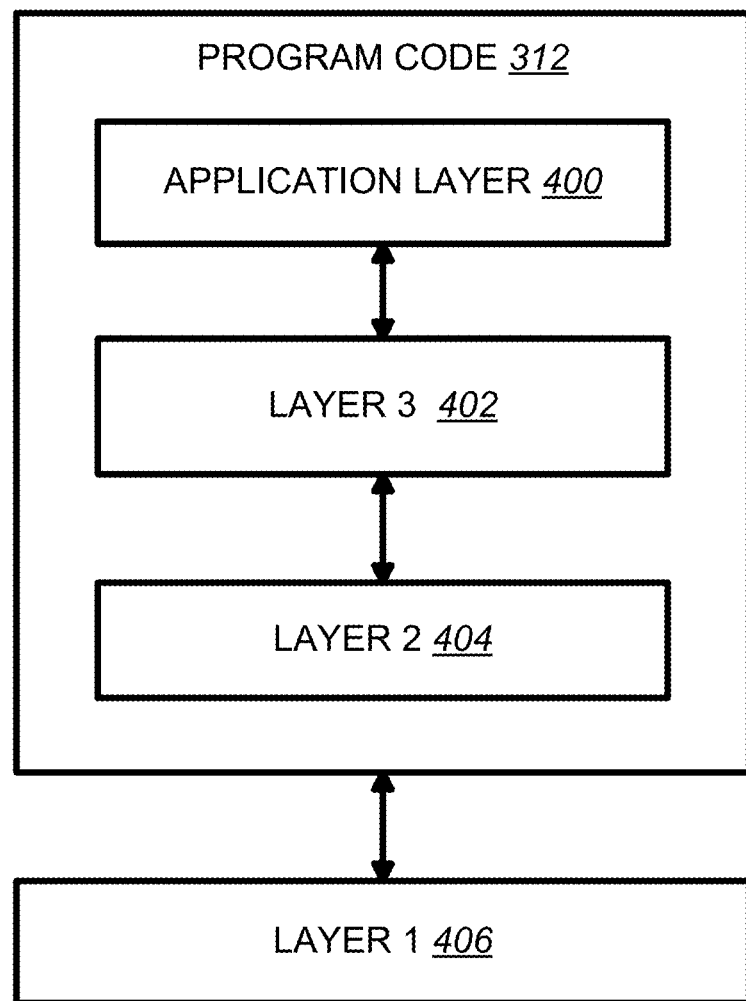
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.213 specifies the UE procedure for V2X transmission in LTE/LTE-A. The V2X transmissions are performed as sidelink transmission mode 3 or sidelink transmission mode 4 as follows:

14 UE Procedures Related to Sidelink

A UE can be configured by higher layers with one or more PSSCH resource configuration(s). A PSSCH resource configuration can be for reception of PSSCH, or for transmission of PSSCH. The physical sidelink shared channel related procedures are described in Subclause 14.1.

A UE can be configured by higher layers with one or more PSCCH resource configuration(s). A PSCCH resource configuration can be for reception of PSCCH, or for transmission of PSCCH and the PSCCH resource configuration is associated with either sidelink transmission mode 1,2,3 or sidelink transmission mode 4. The physical sidelink control channel related procedures are described in Subclause 14.2.

[ . . . ]

14.1 Physical Sidelink Shared Channel Related Procedures 14.1.1 UE Procedure for Transmitting the PSSCH

[ . . . ]

If the UE transmits SCI format 1 on PSCCH according to a PSCCH resource configuration in subframe n, then for the corresponding PSSCH transmissions of one TB for sidelink transmission mode 3,
the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.

for sidelink transmission mode 4,
the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4B.

[ . . . ]

14.1.1.6 UE Procedure for Determining the Subset of Resources to be Reported to Higher Layers in PSSCH Resource Selection in Sidelink Transmission Mode 4 and in Sensing Measurement in Sidelink Transmission Mode 3

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Subclause 14.1.1.4B.

In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers (described in [11]). $C_{resel}$ is determined by $C_{resel}=10*SL\_RESOURCE\_RESELECTION\_COUNTER$, where SL_RESOURCE_RESELECTION_COUNTER is provided by higher layers [11].

If partial sensing is not configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}$−1. The UE shall assume that any set of $L_{subCH}$ contiguous sub-channels included in the corresponding PSSCH resource pool (described in 14.1.5) within the time interval [n+$T_1$, n+$T_2$] corresponds to one candidate single-subframe resource, where selections of $T_1$ and $T_2$ are up to UE implementations under $T_1 \leq 4$ and $T_{2min}(prio_{TX}) \leq T_2 \leq 100$, if $T_{2min}(prio_{TX})$ is provided by higher layers for $prio_{TX}$, otherwise $20 \leq T_2 \leq 100$. UE selection of $T_2$ shall fulfil the latency requirement. The total number of the candidate single-subframe resources is denoted by $M_{total}$.

2) The UE shall monitor subframes $t_{n'-10 \times P_{step}}^{SL}$, $t_{n'-10 \times P_{step}+1}^{SL}$, . . . , $t_{n'-1}^{SL}$ except for those in which its transmissions occur, where $t_{n'}^{SL}=n$ if subframe n belongs to the set ($t_0^{SL}$, $t_1^{SL}$, . . . , $t_{T_{max}}^{SL}$), otherwise subframe $t_{n'}^{SL}$ is the first subframe after subframe n belonging to the set ($t_0^{SL}$, $t_1^{SL}$, . . . , $t_{T_{max}}^{SL}$). The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:
the UE has not monitored subframe $t_z^{SL}$ in Step 2.
there is an integer j which meets $y+j \times P'_{rsvp\_TX}=z+P_{step} \times k \times q$ where j=0, 1, . . . , $C_{resel}-1$, $P'_{rsvp\_TX}=P_{step} \times P_{rsvp\_TX}/100$, k is any value allowed by the higher layer parameter restrictResourceReservationPeriod and q=1,2, . . . , Q. Here, $$Q = \frac{1}{k}$$

if k<1 and $n'-z \leq P_{step} \times k$, where $t_{n'}^{SL}=n$ if subframe n belongs to the set $t_0^{SL}$, $t_1^{SL}$, . . . , $t_{T_{max}}^{SL}$, otherwise subframe $t_{n'}^{SL}$ is the first subframe belonging to the set $t_0^{SL}$, $t_1^{SL}$, . . . , $t_{T_{max}}^{SL}$ after subframe n; and Q=1 otherwise.

6) The UE shall exclude any candidate single-subframe resource $R_{x,y}$ from the set $S_A$ if it meets all the following conditions:
   the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.
   PSSCH-RSRP measurement according to the received SCI format 1 is higher than $Th_{prio_{TX},prio_{RX}}$.
   the SCI format received in subframe $t_m^{SL}$ or the same SCI format 1 which is assumed to be received in subframe(s) $t_{m+q \times P_{step} \times P_{rsvp\_RX}}$ determines according to 14.1.1.4C the set of resource blocks and subframes which overlaps with $R_{x, y+j \times P_{rsvp\_TX}}$ for $q=1, 2, \ldots, Q$ and $j=0, 1, \ldots, C_{resel}-1$. Here, $$Q = \frac{1}{P_{rsvp\_RX}} P_{rsvp\_RX} < 1$$

and $n'-m \leq P_{step} \times P_{rsvp\_RX}$, where $t_{n'}^{SL}=n$ if subframe n belongs to the set $(t_0^{SL}, t_1^{SL}, \ldots, t_{T_{max}}^{SL})$, otherwise subframe $t_{n'}^{SL}$ is the first subframe after subframe n belonging to the set $(t_0^{SL}, t_1^{SL}, \ldots, t_{T_{max}}^{SL})$; otherwise $Q=1$.

7) If the number of candidate single-subframe resources remaining in the set $S_A$ is smaller than $0.2 \cdot M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for $k=0, \ldots, L_{subCH}-1$ in the monitored subframes in Step 2 that can be expressed by $$t_{y-P_{step}*j}^{SL}$$

for a non-negative integer j if $P_{rsvp} \geq 100$, and $$t_{y-P'_{rsvp\_TX}*j}^{SL}$$

for a non negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.

10) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.
[ . . . ]

14.2 Physical Sidelink Control Channel Related Procedures
For sidelink transmission mode 1, if a UE is configured by higher layers to receive DCI format 5 with the CRC scrambled by the SL-RNTI, the UE shall decode the PDCCH/EPDCCH according to the combination defined in Table 14.2-1.
[Table 14.2-1 of 3GPP TS 36.213 V15.4.0, Entitled "PDCCH/EPDCCH Configured by SL-RNTI", is Reproduced as FIG. 5]

For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.
[Table 14.2-2 of 3GPP TS 36.213 V15.4.0, Entitled "PDCCH/EPDCCH Configured by SL-V-RNTI or SL-SPS-V-RNTI", is Reproduced as FIG. 6]

The carrier indicator field value in DCI format 5A corresponds to v2x-InterFreqInfo.

14.2.1 UE Procedure for Transmitting the PSCCH
[ . . . ]
For sidelink transmission mode 3,
The UE shall determine the subframes and resource blocks for transmitting SCI format 1 as follows:
   SCI format 1 is transmitted in two physical resource blocks per slot in each subframe where the corresponding PSSCH is transmitted.
   If the UE receives in subframe n DCI format 5A with the CRC scrambled by the SL-V-RNTI, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-3}.$$

$L_{Init}$ is the value indicated by "Lowest index of the sub-channel allocation to the initial transmission" associated with the configured sidelink grant (described in [8]), $(t_0^{SL}, t_1^{SL}, t_{2hu\ SL}, \ldots)$ is determined by Subclause 14.1.5, the value m is indicated by 'SL index' field in the corresponding DCI format 5A according to Table 14.2.1-1 if this field is present and $m=0$ otherwise, $T_{DL}$ is the start of the downlink subframe carrying the DCI, and $N_{TA}$ and $T_S$ are described in [3].

If "Time gap between initial transmission and retransmission" in the configured sidelink grant (described in [8]) is not equal to zero, another transmission of PSCCH is in the PSCCH resource $L_{ReTX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init}$. $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

The UE shall set the contents of the SCI format 1 as follows:
   the UE shall set the Modulation and coding scheme as indicated by higher layers.

the UE shall set the "Priority" field according to the highest priority among those priority(s) indicated by higher layers corresponding to the transport block.

the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.

the UE shall set the Resource reservation according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{cs,\lambda}$ among $\{0, 3, 6, 9\}$ in each PSCCH transmission.

For sidelink transmission mode 4,

The UE shall determine the subframes and resource blocks for transmitting SCI format 1 as follows:

SCI format 1 is transmitted in two physical resource blocks per slot in each subframe where the corresponding PSSCH is transmitted.

If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$.

If "Time gap between initial transmission and retransmission" in the configured sidelink grant (described in [8]) is not equal to zero, another transmission of PSCCH is in the PSCCH resource $L_{ReTX}$ in subframe $t_{n+SF_{gap}}^{SL}$ where $SF_{gap}$ is the value indicated by "Time gap between initial transmission and retransmission" field in the configured sidelink grant, $L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

the UE shall set the contents of the SCI format 1 as follows:

the UE shall set the Modulation and coding scheme as indicated by higher layers.

the UE shall set the "Priority" field according to the highest priority among those priority(s) indicated by higher layers corresponding to the transport block.

the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.

the UE shall set the Resource reservation field according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{cs,\lambda}$ among $\{0, 3, 6, 9\}$ in each PSCCH transmission.

[Table 14.2.1-1 of 3GPP TS 36.213 V15.4.0, Entitled "Mapping of DCI Format 5A Offset Field to Indicated Value m", is Reproduced as FIG. 7]

[Table 14.2.1-2 of 3GPP TS 36.213 V15.4.0, Entitled "Determination of the Resource Reservation Field in SCI Format 1", is Reproduced as FIG. 8]

14.2.2 UE Procedure for Receiving the PSCCH

For each PSCCH resource configuration associated with sidelink transmission mode 3, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

For each PSCCH resource configuration associated with sidelink transmission mode 4, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

3GPP TS 36.212 specifies CRC attachment for downlink shared channel and downlink control information in LTE/LTE-A (as shown below). The downlink shared channel and downlink control information are for communication between network node and UE, i.e. Uu link. The sidelink shared channel and sidelink control information are for communication between UEs, i.e. PC5 link or sidelink.

5.3.3.1.9A Format 5A

DCI format 5A is used for the scheduling of PSCCH, and also contains several SCI format 1 fields used for the scheduling of PSSCH.

The following information is transmitted by means of the DCI format 5A:

Carrier indicator –3 bits. This field is present according to the definitions in [3].

Lowest index of the subchannel allocation to the initial transmission $-\lceil \log_2(N_{subchannel}^{SL}) \rceil$ bits as defined in subclause 14.1.1.4C of [3].

SCI format 1 fields according to 5.4.3.1.2:
  Frequency resource location of initial transmission and retransmission.
  Time gap between initial transmission and retransmission.
  SL index –2 bits as defined in subclause 14.2.1 of [3] (this field is present only for cases with TDD operation with uplink-downlink configuration 0-6).

When the format 5A CRC is scrambled with SL-SPS-V-RNTI, the following fields are present:
  SL SPS configuration index –3 bits as defined in subclause 14.2.1 of [3].
  Activation/release indication –1 bit as defined in subclause 14.2.1 of [3].
  [ . . . ]

5.4.3 Sidelink Control Information 5.4.3.1 SCI Formats

The fields defined in the SCI formats below are mapped to the information bits $a_0$ to $a_{A-1}$ as follows.

Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

[ . . . ]

5.4.3.1.2 SCI format 1

SCI format 1 is used for the scheduling of PSSCH.

The following information is transmitted by means of the SCI format 1:

Priority –3 bits as defined in subclause 4.4.5.1 of [7].

Resource reservation –4 bits as defined in subclause 14.2.1 of [3].

Frequency resource location of initial transmission and retransmission $-\lceil \log_2(N_{subchannel}^{SL} (N_{subchannel}^{SL}+1)/2)\rceil$ bits as defined in subclause 14.1.1.4C of [3].

Time gap between initial transmission and retransmission –4 bits as defined in subclause 14.1.1.4C of [3].

Modulation and coding scheme –5 bits as defined in subclause 14.2.1 of [3].

Retransmission index –1 bit as defined in subclause 14.2.1 of [3].

Transmission format –1 bit, where value 1 indicates a transmission format including rate-matching and TBS scaling, and value 0 indicates a transmission format including puncturing and no TBS-scaling. This field is only present if the transport mechanism selected by higher layers indicates the support of rate matching and TBS scaling.

Reserved information bits are added until the size of SCI format 1 is equal to 32 bits. The reserved bits are set to zero.

3GPP TS 36.211 specifies generation for physical sidelink shared channel and physical sidelink control channel in LTE/LTE-A (as shown below). The physical sidelink shared channel and physical sidelink control channel are for communication between devices, i.e. PC5 link or device-to-device link. The physical sidelink shared channel (PSSCH) delivers data/transport block for sidelink shared channel (SL-SCH). The physical sidelink control channel (PSCCH) delivers sidelink control information (SCI).

9 Sidelink 9.1 Overview

A sidelink is used for ProSe direct communication and ProSe direct discovery between UEs.

9.1.1 Physical Channels

A sidelink physical channel corresponds to a set of resource elements carrying information originating from higher layers and is the interface defined between 3GPP TS 36.212 [3] and the present document 3GPP TS 36.211. The following sidelink physical channels are defined:

Physical Sidelink Shared Channel, PSSCH

Physical Sidelink Control Channel, PSCCH

Generation of the baseband signal representing the different physical sidelink channels is illustrated in FIG. 5.3-1.

3GPP RP-191723 specifies the Justification and objective of study item on NR V2X as follows:

3 Justification

To expand the 3GPP platform to the automotive industry, the initial standard on support of V2V services was completed in September 2016. Enhancements that focusing on additional V2X operation scenarios leveraging the cellular infrastructure, are completed in March 2017 as 3GPP V2X phase 1 for inclusion in Release 14 LTE. In Rel-14 LTE V2X, a basic set of requirements for V2X service in TS 22.185 derived from TR 22.885 has been supported, which are considered sufficient for basic road safety service. Vehicles (i.e., UEs supporting V2X applications) can exchange their own status information through sidelink, such as position, speed and heading, with other nearby vehicles, infrastructure nodes and/or pedestrians.

3GPP V2X phase 2 in Rel-15 introduces a number of new features in sidelink, including: carrier aggregation, high order modulation, latency reduction, and feasibility study on both transmission diversity and short TTI in sidelink. All these enhanced features in 3GPP V2X phase 2 are primary base on LTE and require co-existing with Rel-14 UE in same resource pool.

SA1 has completed enhancement of 3GPP support for V2X services (eV2X services) in Rel-15. The consolidated requirements for each use case group (see below) are captured in TR 22.886, and a set of the normative requirements are defined in TS 22.186 in Rel-15.

SA1 has identified 25 use cases for advanced V2X services and they are categorized into four use case groups: vehicles platooning, extended sensors, advanced driving and remote driving. The detailed description of each use case group is provided as below.

Vehicles Platooning enables the vehicles to dynamically form a group travelling together. All the vehicles in the platoon receive periodic data from the leading vehicle, in order to carry on platoon operations. This information allows the distance between vehicles to become extremely small, i.e., the gap distance translated to time can be very low (sub second). Platooning applications may allow the vehicles following to be autonomously driven.

Extended Sensors enables the exchange of raw or processed data gathered through local sensors or live video data among vehicles, RSUs, devices of pedestrians and V2X application servers. The vehicles can enhance the perception of their environment beyond what their own sensors can detect and have a more holistic view of the local situation.

Advanced Driving enables semi-automated or fully-automated driving. Longer inter-vehicle distance is assumed. Each vehicle and/or RSU shares data obtained from its local sensors with vehicles in proximity, thus allowing vehicles to coordinate their trajectories or maneuvers. In addition, each vehicle shares its driving intention with vehicles in proximity. The benefits of this use case group are safer traveling, collision avoidance, and improved traffic efficiency.

Remote Driving enables a remote driver or a V2X application to operate a remote vehicle for those passengers who cannot drive themselves or a remote vehicle located in dangerous environments. For a case where variation is limited and routes are predictable, such as public transportation, driving based on cloud computing can be used. In addition, access to cloud-based back-end service platform can be considered for this use case group.

4 Objective 4.1 Objective of SI or Core Part WI or Testing Part WI

The objective of this work item is to specify radio solutions that are necessary for NR to support advanced V2X services (except the remote driving use case which was studied in TR 38.824) based on the study outcome captured in TR 38.885.

1. NR sidelink: Specify NR sidelink solutions necessary to support sidelink unicast, sidelink groupcast, and sidelink broadcast for V2X services, considering in-network coverage, out-of-network coverage, and partial network coverage.

Support of sidelink signals, channels, bandwidth part, and resource pools [RAN1, RAN2]

Resource allocation [RAN1, RAN2]

Mode 1

NR sidelink scheduling by NR Uu and LTE Uu as per the study outcome

Mode 2

Sensing and resource selection procedures based on sidelink pre-configuration and configuration by NR Uu and LTE Uu as per the study outcome Support for simultaneous configuration of Mode 1 and Mode 2 for a UE Transmitter UE operation in this configuration is to be discussed after the design of mode 1 only and mode 2 only.

Receiver UE can receive the transmissions without knowing the resource allocation mode used by the transmitter UE.

UE relaying resource pool configuration or resource configuration is not supported in this work in Rel-16.

Sidelink synchronization mechanism as per the study outcome [RAN1, RAN2]

Procedures selecting synchronization reference

S-SSB and procedures to transmit and receive it, including when GNSS and gNB/eNB are unavailable Use of RS for sidelink synchronization if specification impact is identified Solutions for 'not co-channel' in-device coexistence between LTE and NR sidelinks TDM-based solutions as per the study outcome [RAN1, RAN2, RAN4]

FDM-based solutions with static power allocation as per the study outcome [RAN4]

This will not consider the case where LTE and NR sidelinks are in the same frequency band.

No impact to LTE specifications at least from RAN1 and RAN2 perspective.

Sidelink physical layer procedures as per the study outcome

HARQ procedures [RAN1, RAN2]

CSI acquisition for unicast [RAN1]

CQI/RI reporting is supported and they are always reported together. No PMI reporting is supported in this work. Multi-rank PSSCH transmission is supported up to two antenna ports.

In sidelink, CSI is delivered using PSSCH (including PSSCH containing CSI only) using the resource allocation procedure for data transmission.

Power control [RAN1, RAN2]

Congestion control [RAN1, RAN2]

Sidelink L2/L3 protocols and signalling

Support of sidelink transmission and reception in RRC, MAC, RLC, PDCP, and SDAP [RAN2]

AS level link management for unicast [RAN2, RAN1]

Define the criteria of PC5 availability/unavailability for unicast based on this functionality.

Network solutions to support NR sidelink

V2X service authorization [RAN3]

F1 signalling for support of NR V2X [RAN3]

Resource coordination between NG-RAN nodes for V2X sidelink communication, taking into consideration previous RAN3 discussions [RAN3]

UE Tx and Rx RF requirement [RAN4]

This requirement should ensure coexistence between sidelink and Uu interface in the same and adjacent channels in licensed spectrum coexistence with other V2X technologies in the adjacent channel in ITS spectrum in 5.9 GHz, without assuming that 5.9 GHz spectrum will be universally available nor that it will be universally available in sufficient quantity to support NR V2X advanced use cases RRM core requirement [RAN4]

The solutions should cover both the operating scenario where the carrier(s) is/are dedicated to V2X services and the operating scenario where the carrier(s) is/are licensed spectrum and also used for NR Uu/LTE Uu operation.

NR sidelink design starts with frequencies in FR1, and NR sidelink in FR2 is supported by applying the design for FR1 and PT-RS to the numerologies agreed for FR2. No FR2 specific optimization is supported in this WI except PT-RS. No beam management is supported in this work.

For the scenarios of NR sidelink carrier, this work will consider a single carrier for the NR sidelink transmission and reception.

In this work, 2Rx antennas as well as 4Rx antennas are supported. The full range of speeds defined in SA1 (TS 22.186) needs to be supported in FR1.

It is assumed that any co-channel coexistence requirements and mechanisms of NR sidelink with non-3GPP technologies will not be defined by 3GPP.

In the RAN1 #94 meeting (as captured in 3GPP R1-1810051), RAN1 has the following agreements about NR V2X:

Agreements:

RAN1 assumes that higher layer decides if a certain data has to be transmitted in a unicast, groupcast, or broadcast manner and inform the physical layer of the decision. For a transmission for unicast or groupcast, RAN1 assumes that the UE has established the session to which the transmission belongs to. Note that RAN1 has not made agreement about the difference among transmissions in unicast, groupcast, and broadcast manner.

RAN1 assumes that the physical layer knows the following information for a certain transmission belonging to a unicast or groupcast session. Note RAN1 has not made agreement about the usage of this information.

ID

Groupcast: destination group ID, FFS: source ID

Unicast: destination ID, FFS: source ID

HARQ process ID (FFS for groupcast)

RAN1 can continue discussion on other information

Agreements:

RAN1 to study the following topics for the SL enhancement for unicast and/or groupcast. Other topics are not precluded.

HARQ feedback

CSI acquisition

Open loop and/or closed-loop power control

Link adaptation

Multi-antenna transmission scheme

[ . . . ]

R1-1809799 Offline summary for 7.2.4.1.2 Physical layer structures and procedure(s) LGE Agreements:

At least PSCCH and PSSCH are defined for NR V2X.

PSCCH at least carries information necessary to decode PSSCH.

Note: PSBCH will be discussed in the synchronization agenda.

[ . . . ]

Agreements:

RAN1 to continue study on multiplexing physical channels considering at least the above aspects:

Multiplexing of PSCCH and the associated PSSCH (here, the "associated" means that the PSCCH at least carries information necessary to decode the PSSCH).
Study further the following options:
[ . . . ]
Option 3: A part of PSCCH and the associated PSSCH are transmitted using overlapping time resources in non-overlapping frequency resources, but another part of the associated PSSCH and/or another part of the PSCCH are transmitted using non-overlapping time resources.
[ . . . ]
Agreements:
At least two sidelink resource allocation modes are defined for NR-V2X sidelink communication
Mode 1: Base station schedules sidelink resource(s) to be used by UE for sidelink transmission(s)
Mode 2: UE determines (i.e. base station does not schedule) sidelink transmission resource(s) within sidelink resources configured by base station/network or pre-configured sidelink resources
In the RAN1 #94bis meeting (as captured in 3GPP R1-1812101), RAN1 has the following agreements about NR V2X:
Agreements:
Layer-1 destination ID is conveyed via PSCCH.
Additional Layer-1 ID(s) is conveyed via PSCCH at least for the purpose of identifying which transmissions can be combined in reception when HARQ feedback is in use.
Agreements:
For unicast, sidelink HARQ feedback and HARQ combining in the physical layer are supported.
For groupcast, sidelink HARQ feedback and HARQ combining in the physical layer are supported.
Agreements:
Sidelink control information (SCI) is defined.
SCI is transmitted in PSCCH.
SCI includes at least one SCI format which includes the information necessary to decode the corresponding PSSCH.
NDI, if defined, is a part of SCI.
Sidelink feedback control information (SFCI) is defined.
SFCI includes at least one SFCI format which includes HARQ-ACK for the corresponding PSSCH.
Agreements:
At least resource pool is supported for NR sidelink
Resource pool is a set of time and frequency resources that can be used for sidelink transmission and/or reception.
A resource pool is inside the RF bandwidth of the UE.
UE assumes a single numerology in using a resource pool.
Multiple resource pools can be configured to a single UE in a given carrier.
In the RAN1 #95 meeting (as captured in 3GPP R1-1901482), RAN1 has the following agreements about NR V2X:
Agreements:
At least CP-OFDM is supported.
Continue study on whether to support DFT-S-OFDM including the potential issues and the following potential benefit:
Synchronization coverage enhancement
PSCCH coverage enhancement, e.g., with Option 2 of PSCCH/PSSCH multiplexing with the restriction that PSCCH and PSSCH use adjacent frequency resources
Feedback channel coverage enhancement
A single waveform is used in all the sidelink channels in a carrier.
Note: A sequence based channel can be supported in any waveform.
(Pre-)configuration will be used to determine the used waveform if the specification supports multiple waveforms.
Agreements:
BWP is defined for NR sidelink.
In a licensed carrier, SL BWP is defined separately from BWP for Uu from the specification perspective. FFS the relation with Uu BWP.
The same SL BWP is used for both Tx and Rx.
Each resource pool is (pre)configured within a SL BWP.
Only one SL BWP is (pre)configured for RRC idle or out of coverage NR V2X UEs in a carrier.
For RRC connected UEs, only one SL BWP is active in a carrier. No signalling is exchanged in sidelink for activation and deactivation of SL BWP.
Working assumption: only one SL BWP is configured in a carrier for a NR V2X UE
Revisit in the next meeting if significant issues are found
Numerology is a part of SL BWP configuration.
Note: This does not intend to make restriction in designing the sidelink aspects related to SL BWP.
Note: This does not preclude the possibility where a NR V2X UE uses a Tx RF bandwidth the same as or different than the SL BWP.
Working assumption:
Regarding PSCCH/PSCCH multiplexing, at least option 3 is supported for CP-OFDM.
RAN1 assumes that transient period is not needed between symbols containing PSCCH and symbols not containing PSCCH in the supported design of option 3.
[ . . . ]
Agreements:
Physical sidelink feedback channel (PSFCH) is defined and it is supported to convey SFCI for unicast and groupcast via PSFCH.
Agreements:
When SL HARQ feedback is enabled for unicast, the following operation is supported for the non-CBG case:
Receiver UE generates HARQ-ACK if it successfully decodes the corresponding TB. It generates HARQ-NACK if it does not successfully decode the corresponding TB after decoding the associated PSCCH which targets the receiver UE.
[ . . . ]
Agreements:
When SL HARQ feedback is enabled for groupcast, the following operations are further studied for the non-CBG case:
Option 1: Receiver UE transmits HARQ-NACK on PSFCH if it fails to decode the corresponding TB after decoding the associated PSCCH. It transmits no signal on PSFCH otherwise. Details are FFS including the following:
Option 2: Receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE. Details are FFS including the following:

Agreements:

It is supported to enable and disable SL HARQ feedback in unicast and groupcast.

Agreements:

Study further whether to support UE sending to gNB information which may trigger scheduling retransmission resource in mode 1. FFS including
Which information to send
Which UE to send to gNB
Which channel to use
Which resource to use Agreements:

The following NR sidelink resource allocation techniques by NR Uu for mode-1 are supported:
Dynamic resource allocation
Configured grant.
FFS whether type-1 and/or type-2

In the RAN1 #AH_1901 meeting (as captured in 3GPP R1-1901483), RAN1 has the following agreements about NR V2X:

Agreements:

For time domain resources of a resource pool for PSSCH,
Support the case where the resource pool consists of non-contiguous time resources
For frequency domain resources of a resource pool for PSSCH,
Down select following options:
Option 1: The resource pool always consists of contiguous PRBs
Option 2: The resource pool can consist of non-contiguous PRBs Agreements:

Layer-1 destination ID can be explicitly included in SCI
The following additional information can be included in SCI
Layer-1 source ID
FFS how to determine Layer-1 source ID
FFS size of Layer-1 source ID
HARQ process ID
NDI
RV Agreements:

For determining the resource of PSFCH containing HARQ feedback, support that the time gap between PSSCH and the associated PSFCH is not signaled via PSCCH at least for modes 2(a)(c)(d) (if respectively supported)
[ . . . ]

Working assumption:

When HARQ feedback is enabled for groupcast, support (options as identified in RAN1#95):
Option 1: Receiver UE transmits only HARQ NACK
Option 2: Receiver UE transmits HARQ ACK/NACK Agreements:

It is supported that in mode 1 for unicast, the in-coverage UE sends an indication to gNB to indicate the need for retransmission
At least PUCCH is used to report the information
If feasible, RAN1 reuses PUCCH defined in Rel-15
The gNB can also schedule re-transmission resource
[ . . . ]

Agreements:

(Pre-)configuration indicates whether SL HARQ feedback is enabled or disabled in unicast and/or groupcast.
When (pre-)configuration enables SL HARQ feedback, FFS whether SL HARQ feedback is always used or there is additional condition of actually using SL HARQ feedback Agreements:

Sub-channel based resource allocation is supported for PSSCH
FFS details for sub-channels
FFS other use cases for sub-channel (e.g., measurement, interaction with PSCCH, etc.)

Agreements:

SCI decoding applied during sensing procedure provides at least information on sidelink resources indicated by the UE transmitting the SCI Agreements:

When NR Uu schedules NR SL mode 1, both type 1 and type 2 configured grants are supported for NR SL
In the RAN1 #96 meeting (as captured in 3GPP R1-1905837), RAN1 has the following agreements about NR V2X:

Agreements:

Rel-16 NR sidelink supports CP-OFDM only.

Agreements:

For the operation regarding PSSCH, a UE performs either transmission or reception in a slot on a carrier.
NR sidelink supports for a UE:
A case where all the symbols in a slot are available for sidelink.
Another case where only a subset of consecutive symbols in a slot is available for sidelink
Note: this case is not intended to be used for the ITS spectra, if there is no forward-compatibility issue. Finalize in the WI phase whether there is such an issue or not
The subset is NOT dynamically indicated to the UE Agreements:

At least for sidelink HARQ feedback, NR sidelink supports at least a PSFCH format which uses last symbol (s) available for sidelink in a slot.

Agreements:

(Pre-)configuration indicates the time gap between PSFCH and the associated PSSCH for Mode 1 and Mode 2.

Agreements:

For sidelink groupcast, it is supported to use TX-RX distance and/or RSRP in deciding whether to send HARQ feedback.
Details to be discussed during WI phase, including whether the information on TX-RX distance is explicitly signaled or implicitly derived, whether/how this operation is related to resource allocation, accuracy of distance and/or RSRP, the aspects related to "and/or", etc.
This feature can be disabled/enabled Agreements:

Blind retransmissions of a TB are supported for SL by NR-V2X

Agreements:

NR V2X Mode-2 supports reservation of sidelink resources at least for blind retransmission of a TB Agreements:

Mode-2 sensing procedure utilizes the following sidelink measurement
L1 SL-RSRP based on sidelink DMRS when the corresponding SCI is decoded FFS whether/which measurement is used if the corresponding SCI is not decoded e.g. SL-RSRP after blind DMRS detection, SL-RSSI In the RAN1 #96bis meeting (as captured in 3GPP R1-1905921), RAN1 has the following agreements about NR V2X:

Agreements:
At least for transmission perspective of a UE in a carrier, at least TDM between PSCCH/PSSCH and PSFCH is allowed for a PSFCH format for sidelink in a slot.
[ . . . ]
Agreements:
A dynamic grant provides resources for one or multiple sidelink transmissions of a single TB.
A configured grant (type-1, type-2) provides a set of resources in a periodic manner for multiple sidelink transmissions.
  UE decides which TB to transmit in each of the occasions indicated by a given configured grant.
[ . . . ]
Agreements:
NR V2X supports an initial transmission of a TB without reservation, based on sensing and resource selection procedure
NR V2X supports reservation of a sidelink resource for an initial transmission of a TB at least by an SCI associated with a different TB, based on sensing and resource selection procedure
  This functionality can be enabled/disabled by (pre-)configuration
FFS Standalone PSCCH transmissions for resource reservations are supported in NR V2X
[ . . . ]
Agreements:
Confirm the following working assumption:
  Working assumption:
    When HARQ feedback is enabled for groupcast, support (options as identified in RAN1#95):
      Option 1: Receiver UE transmits only HARQ NACK
      Option 2: Receiver UE transmits HARQ ACK/NACK
    Note: RAN1 has not concluded the respective applicability of option 1 vs. option 2 yet
Agreements:
In HARQ feedback for groupcast,
  When Option 1 is used for a groupcast transmission, it is supported
    all the receiver UEs share a PSFCH
    FFS: a subset of the receiver UEs share a PSFCH
    FFS: all or a subset of receiver UEs share a pool of PSFCH.
  When Option 2 is used for a groupcast transmission, it is supported
    each receiver UE uses a separate PSFCH for HARQ ACK/NACK.
    FFS: all or a subset of receiver UEs share a PSFCH for ACK transmission and another PSFCH for NACK transmission
Note: Each PSFCH is mapped to a time, frequency, and code resource.
Working assumption:
Regarding the use of TX-RX geographical distance and/or RSRP in determining whether to send HARQ feedback for groupcast
  Support at least the use of TX-RX geographical distance Agreements:
It is supported, in a resource pool, that within the slots associated with the resource pool, PSFCH resources can be (pre)configured periodically with a period of N slot(s)
  N is configurable, with the following values
    1
    At least one more value >1
      FFS details
  The configuration should also include the possibility of no resource for PSFCH. In this case, HARQ feedback for all transmissions in the resource pool is disabled
  HARQ feedback for transmissions in a resource pool can only be sent on PSFCH in the same resource pool In the RAN1 #97 meeting (as captured in 3GPP R1-1907973), RAN1 has the following agreements about NR V2X:

Agreements:
Transmission of PSSCH is mapped onto contiguous PRBs only
Agreements:
Sub-channel size is (pre)configurable.
Conclusion:
If two-stage SCI is supported, the following details are used.
  Information related to channel sensing is carried on 1st-stage.
  2nd-stage is decoded by using PSSCH DMRS.
  Polar coding used for PDCCH is applied to 2nd-stage
  Payload size for 1st-stage in two-stage SCI case is the same for unicast, groupcast, and broadcast in a resource pool.
  After decoding the 1st-stage, the receiver does not need to perform blind decoding of 2nd-stage.
[ . . . ]
Agreements:
Sidelink HARQ ACK/NACK report from transmitter UE to gNB is supported with details FFS.
  Note: this reverts the following agreement from RAN1#96:
    Sidelink HARQ ACK/NACK report from UE to gNB is not supported in Rel-16.
SR/BSR report to gNB for the purpose of requesting resources for HARQ retransmission is not supported.
Agreements:
NR sidelink does not support performing different transmissions of a TB using different configured grants.
Agreements:
For mode 1:
  A dynamic grant by the gNB provides resources for transmission of PSCCH and PSSCH.
[ . . . ]
Agreements:
RAN1 to further select between the following options of sidelink resource reservation for blind retransmissions:
  Option 1: A transmission can reserve resources for none, one, or more than one blind retransmission
  Option 2: A transmission can reserve resource for none or one blind retransmission
Agreements:
For at least option 1 based TX-RX distance-based HARQ feedback for groupcast,
  A UE transmits HARQ feedback for the PSSCH if TX-RX distance is smaller or equal to the communication range requirement. Otherwise, the UE does not transmit HARQ feedback for the PSSCH TX UE's location is indicated by SCI associated with the PSSCH.

The TX-RX distance is estimated by RX UE based on its own location and TX UE location.

The used communication range requirement for a PSSCH is known after decoding SCI associated with the PSSCH Agreements:

For the period of N slot(s) of PSFCH resource, N=2 and N=4 are additionally supported.

Agreements:

For a PSSCH transmission with its last symbol in slot n, when the corresponding HARQ feedback is due for transmission, it is expected to be in slot n+a where a is the smallest integer larger than or equal to K with the condition that slot n+a contains PSFCH resources.

FFS details of K

Agreements:

At least for the case when the PSFCH in a slot is in response to a single PSSCH:

Implicit mechanism is used to determine at least frequency and/or code domain resource of PSFCH, within a configured resource pool. At least the following parameters are used in the implicit mechanism:

Slot index (FFS details) associated with PSCCH/PSSCH/PSFCH

Sub-channel(s) (FFS details) associated with PSCCH/PSSCH

Identifier (FFS details) to distinguish each RX UE in a group for Option 2 groupcast HARQ feedback In the RAN1 #98 meeting (as captured in 3GPP R1-1909942), RAN1 has the following agreements about NR V2X:

Agreements:

In physical layer perspective, a (pre-)configured resource pool can be used for all of unicast, groupcast, and broadcast for a given UE.

There is no (pre-)configuration to inform which cast types are used for the resource pool.

Agreements:

Support 2-stage SCI $1^{st}$ SCI is carried in PSCCH.

FFS: other details

Agreements:

For Mode-1, support both same-carrier & cross-carrier scheduling from gNB to NR SL Whether or not to have the cross-carrier scheduling indicator in the DCI given that there is only one SL carrier for a UE in Rel-16

Agreements:

At least for dynamic grant, the timing and resource for PUCCH used for conveying SL HARQ feedback to the gNB are based on the indication(s) in the corresponding PDCCH Agreements:

DCI indicates the slot offset between DCI reception and the first sidelink transmission scheduled by DCI.

The minimum gap between DCI and the first scheduled sidelink transmission is not smaller than the corresponding UE processing time.

[ . . . ]

Agreements:

At least for mode 2, The maximum number of SL resources $N_{MAX}$ reserved by one transmission including current transmission is [2 or 3 or 4]

Aim to select the particular number in RAN1#98

$N_{MAX}$ is the same regardless of whether HARQ feedback is enabled or disabled Agreements:

At least for mode 2, (Pre-)configuration can limit the maximum number of HARQ (re-)transmissions of a TB Up to 32

FFS the set of values

FFS signaling details (UE-specific, resource pool specific, QoS specific, etc.)

If no (pre)configuration, the maximum number is not specified

Note: this (pre-)configuration information is NOT intended for the Rx UE

Agreements:

In Mode-2, SCI payload indicates sub-channel(s) and slot(s) used by a UE and/or reserved by a UE for PSSCH (re-)transmission(s)

SL minimum resource allocation unit is a slot

FFS whether when the resource allocation is multiple slots, the slots can be aggregated FFS whether in case of multiple slots, the indicated slots are contiguous or not Working assumption:

An indication of a priority of a sidelink transmission is carried by SCI payload This indication is used for sensing and resource (re) selection procedures This priority is not necessarily the higher layer priority Agreements:

The resource (re-)selection procedure includes the following steps

Step 1: Identification of candidate resources within the resource selection window FFS details Step 2: Resource selection for (re-)transmission(s) from the identified candidate resources FFS details

[ . . . ]

Agreements:

For PSSCH-to-HARQ feedback timing, to down-select:

Option 1: K is the number of logical slots (i.e., the slots within the resource pool)

Option 2: K is the number of physical slots (i.e., the slots within and outside the resource pool)

FFS how to determine K.

Agreements:

For TX-RX distance-based HARQ feedback for groupcast Option 1,

The location information of TX UE is indicated by the $2^{nd}$ stage SCI payload FFS whether/how higher layer signaling is also used in signaling the location information FFS whether/how to handle when the location information is not available at TX and/or RX UE.

As for the email discussion after the RAN1 #98 meeting, RAN1 has the following agreements about NR V2X:

Agreements in [98-NR-10]:

In Rel-16, at least for sequence-based PSFCH format with one symbol (not including AGC training period), it is not supported to do FDM between PSSCH/PSCCH and PSFCH.

Discuss further the following:

For a PSFCH format, in the symbols that can be used for PSFCH transmissions in a resource pool, a set of frequency resources is (pre-)configured for the actual use of PSFCH transmissions (i.e., PSFCH transmissions do not happen in other frequency resources).

FFS: Frequency resource sets for PSFCH are separated depending on HARQ feedback option.

At least, it is supported to use a single K value for all UEs in a RX resource pool K=2 is supported FFS: whether to support other K values to be used as a single K value in a resource pool FFS: whether to support the use of multiple K values in a resource pool For implicit mechanism for PSFCH resource determination, Support FDM between PSFCH resources used for HARQ feedback of PSSCH transmissions with different starting sub-channel in the same slot Support FDM between PSFCH resources used for HARQ feedback of PSSCH transmissions with different starting sub-channel(s) in different slots FFS: Support FDM between PSFCH resources used for HARQ feedback of PSSCH transmissions with same starting sub-channel in different slots FFS whether/when to support CDM between PSFCH resources used for HARQ feedback of PSSCH transmissions (e.g., when PSFCH resource is insufficient)

For groupcast HARQ feedback Option 2, support CDM and FDM between PSFCH resources used by different RX UEs for HARQ feedback of the same PSSCH transmission FFS how to multiplex HARQ feedback for unicast, groupcast option 1, and groupcast option 2.

In the RAN1 #98bis meeting (as captured in 3GPP R1-1913275), RAN1 has the following agreements about NR V2X:

Agreements:

A slot is the time-domain granularity for resource pool configuration.

To down-select:

Alt 1. Slots for a resource pool is (pre-)configured with bitmap, which is applied with periodicity Alt 2. Slots for a resource pool is (pre-)configured, where the slots are applied with periodicity.

Agreements:

Support (pre-)configuration of a resource pool consisting of contiguous PRBs only Agreements:

For the number of bits of L1 IDs,

Layer-1 destination ID: 16 bits

Layer-1 source ID: 8 bits

Agreements:

[ . . . ]

Each resource pool is only configured with one $1^{st}$ stage SCI PSCCH format

Agreements:

PSCCH for $1^{st}$ stage SCI with 2 and 3 symbols is supported in Rel-16.

FFS: other length(s) of symbols (e.g., all symbols)

The number of symbols above excludes AGC symbols if any

The number of PSCCH symbols is explicitly (pre-)configured per Tx/Rx resource pool

[ . . . ]

Agreements:

The $2^{nd}$ stage SCI is carried within the resource of the corresponding PSSCH.

Scrambling operation for the $2^{nd}$ stage SCI is applied separately with PSSCH Agreements:

Support $1^{st}$ stage SCI in PSCCH in one subchannel only.

Within one subchannel, there is at most one $1^{st}$ stage SCI, except for spatial re-use Agreements:

Support {10, 15, 20, 25, 50, 75, 100} PRBs for possible sub-channel size.

FFS other values (e.g., 4, 5, 6, etc.)

One value of the above set is (pre)configured for the sub-channel size for the resource pool.

Size of PSCCH: X

X≤N, where N is the number of PRBs of the subchannel

X is (pre)-configurable with values FFS, X

Agreements:

To signal the gap between DCI reception and the first sidelink transmission scheduled by DCI:

A table of values is configured by RRC.

DCI determines which of the configured values is used.

FFS how to determine the slot for the first sidelink transmission (e.g., based on the indicated value, potential async between Uu & SL, different numerologies, etc.)

FFS if the gap is in physical or logical slots.

Agreements:

For reporting SL HARQ-ACK to the gNB:

For dynamic grant and configured grant type-2 in SL, the Rel-15 procedure and signalling for DL HARQ-ACK are reused for the purpose of selecting PUCCH offset/resource and format in UL.

The configuration for SL is separate from Uu link for a UE

FFS how to indicate timing of transmission in PUCCH, including whether physical or logical slots are used For configured grant type-1 in SL, RRC is used to configure PUCCH offset/resource and format in UL (if supported)

Agreements:

Two different UE-specific SL RNTIs are introduced for Mode-1 scheduling: one for CRC scrambling in DCI for a dynamic grant and the other one for CRC scrambling in DCI for a configured grant type-2.

The two above DCIs have the same size

Agreements:

Multiple type-1 configured grants per UE are supported when LTE Uu controls NR SL Up to the same max number of type-1 configured grants per UE when NR Uu controls NR SL Working assumption:

Each transmission in a resource provided by a configured grant contains PSCCH and PSSCH.

Agreements:

For a configured grant in Mode 1 when using SL HARQ feedback:

There is only one HARQ-ACK bit for the configured grant

There is one PUCCH transmission occasion after the last resource in the set of resources provided by a configured grant.

Agreements:

Maximum number of HARQ (re-)transmissions is (pre-)configured per priority per CBR range per transmission resource pool The priority is the one signaled in SCI This includes both blind and feedback-based HARQ (re)-transmission The value range is any value from 1 to 32

If the HARQ (re)transmissions for a TB can have a mixed blind and feedback-based approached (FFS whether or not to support this case), the counter applies to the combined total Agreements:

For PSSCH-to-HARQ feedback timing, K is the number of logical slots (i.e. the slots within the resource pool)

Working assumption:

For TX-RX distance-based HARQ feedback for groupcast Option 1,
  Zone is (pre-)configured with respect to geographical area, and Zone ID associated with TE UE's location is indicated by SCI.
  Details FFS
  Note: this does not intend to impact the discussion on the zone based resource allocation.

Agreements:

For the communication range requirement for TX-RX distance-based HARQ feedback, explicit indication in the $2^{nd}$ stage SCI is used.

Working assumption:

For HARQ feedback in groupcast and unicast, when PSFCH resource is (pre-)configured in the resource pool,
  SCI explicitly indicates whether HARQ feedback is used or not for the corresponding PSSCH transmission.

Agreements:

For the priority indication in $1^{st}$ stage SCI:
  Up to RAN2 on how to define the mapping between the priority indication and the corresponding QoS
  Size is 3 bits (as a working assumption)

In the RAN1 #99 meeting (as captured in the Draft Report of 3GPP TSG RAN WG1 #99), RAN1 has the following agreements about NR V2X:

Agreements:

1st SCI includes at least
  Priority (QoS value),
  PSSCH resource assignment (frequency/time resource for PSSCH),
  Resource reservation period (if enabled),
  PSSCH DMRS pattern (if more than one patterns are (pre-)configured),
  2nd SCI format (e.g. information on the size of 2nd SCI),
  [2]-bit information on amount of resources for $2^{nd}$ SCI (e.g. beta offset or aggregation level)
  Number of PSSCH DMRS port(s)
  5-bit MCS
  FFS on some part of destination ID Agreements:

For Rel-16, (normal CP)
  Support 7, 8, 9, . . . , 14 symbols in a slot without SL-SSB for SL operation
    Target reusing Uu DM-RS patterns for each of the symbol-length, with modifications as necessary
      No other additional spec impact is expected for supporting 7, 8, . . . , 13
      # of DM-RS symbols
        2, 3, 4
  For a dedicated carrier, only 14-symbol is mandatory
There is a single (pre-)configured length of SL symbols in a slot without SL-SSB per SL BWP.
There is a single (pre-)configured starting symbol for SL in a slot without SL-SSB per SL BWP.

Agreements:

From RAN1 perspective, a configured grant for SL can carry a TB for which SL HARQ FB is enabled or disabled.

For any CG, if there is a possibility to carry a TB with SL HARQ FB being enabled, there is always a corresponding PSFCH configuration
  A TB with SL HARQ FB is enabled can be carried by a CG only if there is a corresponding PSFCH configuration for the CG
For a TB with SL HARQ FB is disabled, up to RAN2 how to utilize a CG for the transmission Agreements:

For dynamic grant, DCI contains HARQ ID and NDI.

Agreements:

For dynamic grant, DCI indicates the time-frequency resource allocation with the signalling format used for SCI.
  In addition, the starting sub-channel for initial transmission is signalled in DCI.

Agreements:

To provide additional resources for retransmission upon receiving a SL NACK report, a dynamic grant is used.
  When the initial transmission of a TB is scheduled by a dynamic grant, the CRC of the DCI carrying the dynamic grant is scrambled using the SL RNTI introduced for DCI for a dynamic grant.
    The interpretation of NDI is the same as for Uu for retransmission scheduled by DCI with CRC scrambled by C-RNTI
  When the initial transmission of a TB is scheduled by a configured grant (type-1 or type-2), the CRC of the DCI carrying the dynamic grant is scrambled using the SL RNTI introduced for DCI for a configured grant type-2.
    For interpretation of NDI, the Uu behavior for retransmission scheduled by DCI with CRC scrambled by CS-RNTI is reused.
  (working assumption) The HARQ ID is used to identify the TB for which resources for retransmission are provided (subject to the indication of re-transmission via NDI)

Agreements:

For dynamic grant, the number of retransmissions of a TB is up to the gNB.
For configured grant, the maximum number of times that a TB can be retransmitted using the resources provided by the configured grant is configured per priority per configured grant.

Working assumption:

The timing of the PUCCH used for conveying SL HARQ is indicated in DCI or RRC (only for transmissions without a DCI) in terms of PSFCH-to-PUCCH physical slots, where the slot duration is defined based on the PUCCH SCS.
  Note: it is not intended to define any new sync requirements for gNBs Conclusion:

No support of multiplexing of SL HARQ and Uu UCI on PUCCH or PUSCH in Rel-16
  Note: this reverts the agreements made during RAN1#98b email discussion Agreements:

For dynamic grant and CG:
  If the gNB provides PUCCH resources for feedback, the UE reports SL HARQ FB to the gNB
  If the gNB does not provides PUCCH resources for feedback, the UE does not report SL HARQ FB to the gNB Agreements:

For case of DG and type 2 CG: one combination of "timing and resource for PUCCH" is used to indicate that PUCCH resource is not provided For type 1 CG: no RRC configuration of PUCCH resources indicates that PUCCH resource is not provided Agreements:

At least the following parameters are part of a SL configured grant configuration:
Configuration index of the CG
Time offset (for type-1 only)
Time-frequency allocation (for type-1 only)
Using the same format as in DCI.
Periodicity
The configured grant is associated with a single transmit resource pool.
RAN2 can add other parameters if deemed necessary by RAN2

A UE in mode 1 is configured at least with one transmit resource pool

For type-2 CG, the time-frequency allocation and the configuration index of the CG are indicated in DCI.
All parameters for CG type 2 for activation DCI re-use the same respective parameters configured for CG type 1, when applicable Agreements:

NR supports SL transmissions at least in cell-specific UL resources in Uu.

Agreements:

For signaling frequency resources of actual PSFCH transmission, down select one of followings:
Bitmap indicates RBs in a resource pool Agreements:

When a RX UE sends one bit HARQ-ACK in PSFCH
ACK and NACK are differentiated using different cyclic shift of the same base sequence in the same PRB.
The cyclic shift corresponding to ACK is not defined/used for groupcast option 1.

Agreements:

CDM between PSFCH transmissions from different UEs in the same PRB is supported as follows:
Cyclic shift can be selected based on
the L1 source ID of TX UE for unicast and groupcast option 1.
the L1 source ID of TX UE and the member ID of RX UE in groupcast option 2.
FFS whether or not to use additional parameter(s) for the selection (e.g., using PSCCH DM-RS, etc) 4 to conclude this week
Base sequence is
(Pre-)configured per resource pool Working assumption:

One PSFCH transmission can include up to X HARQ-ACK bits.
X=1

One or multiple of following terminologies may be used hereafter:
BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
TRP: A transmission and reception point provides network coverage and directly communicates with UEs. TRP could also be referred to as distributed unit (DU) or network node.
Cell: A cell is composed of one or multiple associated TRPs, i.e. coverage of the cell is composed of coverage of all associated TRP(s). One cell is controlled by one BS. Cell could also be referred to as TRP group (TRPG).
NR-PDCCH: A channel carries downlink control signal which is used to control communication between a UE and a network side. A network transmits NR-PDCCH on configured control resource set (CORESET) to the UE.
Slot: A slot could be a scheduling unit in NR. A slot duration has 14 OFDM symbols.
Mini-slot: A scheduling unit with duration less than 14 OFDM symbols.
DL common signal: A data channel carrying common information that targets for multiple UEs in a cell or all UEs in a cell. Example of DL common signal could be system information, paging, RAR.

One or multiple of following assumptions for network side may be used hereafter:
Downlink timing of TRPs in the same cell are synchronized.
RRC layer of network side is in BS.

One or multiple of following assumptions for UE side may be used hereafter:
There are at least two UE (RRC) states: connected state (or called active state) and non-connected state (or called inactive state or idle state). Inactive state may be an additional state or belong to connected state or non-connected state.

For NR V2X transmission, there are two sidelink resource allocation modes defined for NR-V2X sidelink communication (as discussed in 3GPP R1-1810051):
mode 1 is that base station/network node can schedule sidelink resource(s) to be used by UE for sidelink transmission(s), which concept is similar as sidelink transmission mode 3 in LTE/LTE-A (as discussed in 3GPP TS 36.213);
mode 2 is that UE determines (i.e. base station/network node does not schedule) sidelink transmission resource (s) within sidelink resources configured by base station/network node or pre-configured sidelink resources, which concept is similar as sidelink transmission mode 4 in LTE/LTE-A (as discussed in 3GPP TS 36.213).

For network scheduling mode, the network node may transmit a sidelink (SL) grant on Uu interface for scheduling resources of Physical Sidelink Control Channel (PSCCH) and/or Physical Sidelink Shared Channel (PSSCH). The V2X UE may perform PSCCH and PSSCH transmissions on PC5 interface, in response to the receive sidelink grant. The Uu interface means the wireless interface for communication between network and UE. The PC5 interface means the wireless interface for communication (directly) between UEs or devices.

For UE (autonomous) selection mode, since transmission resource is not scheduled via network, the UE may require performing sensing before selecting a resource for transmission (e.g., sensing-based transmission), in order to avoid resource collision and interference from or to other UEs. Based on the sensing procedure, the UE can determine a valid resource set. The valid resource set may be reported to higher layers (of the UE). The UE may select one or multiple valid resources from the valid resource set to perform sidelink transmission(s) from the UE. The transmission(s) from the UE may be PSCCH and/or PSSCH transmission.

Since NR V2X has requirement of high reliability and high throughput requirement, it is considered to support SL HARQ feedback for unicast and/or groupcast. It could mean that a TX UE transmits a sidelink data transmission to a RX UE, and then the RX UE may transmit SL (Hybrid Automatic Request Request) HARQ feedback to the TX UE via (Physical Sidelink Feedback Channel) PSFCH transmission.

If the SL HARQ feedback is Acknowledgement (ACK), it may mean the RX UE receives and decodes the sidelink data transmission successfully. When the TX UE receives the SL HARQ feedback as ACK, the TX UE may transmit another new sidelink data transmission to the RX UE if there are available data from the TX UE to the RX UE.

If the SL HARQ feedback is NACK, it may mean the RX UE does not receive and decode the sidelink data transmission successfully. When the TX UE receives the SL HARQ feedback as Negative Acknowledgement (NACK), the TX UE may retransmit the sidelink data transmission to the RX UE.

Since the sidelink data retransmission carries the same data packet as the sidelink data transmission, the RX UE may combine the sidelink data transmission and sidelink data retransmission and then perform decoding for the data packet. The combining can increase possibility of decoding successfully.

In the RAN1 #96bis meeting (as discussed in 3GPP R1-1905921), it is supported that in a resource pool, PSFCH resources are (pre)configured periodically with a period of N slot(s), wherein N can be configured as 1, 2, or 4 (as discussed in 3GPP R1-19059021 and R1-1907973). Moreover, the PSFCH periodicity configuration should also include the possibility of no resource for PSFCH. In this case, HARQ feedback for all transmissions in the resource pool is disabled (as discussed in 3GPP R1-1905921).

In network scheduling mode, since the sidelink resources are scheduled or assigned by network node, it is supported that the TX UE reports SL HARQ feedback via PUCCH to the network node. In one embodiment, the TX UE may deliver the SL HARQ feedback, received via PSFCH from the RX UE, to network node via PUCCH. When the network node receives the SL HARQ feedback from the TX UE, the network node can determine whether to schedule sidelink retransmission resource(s) to the TX UE.

For dynamic SL grant or type-2 configured SL grant, the timing and resource of the Physical Uplink Control Channel (PUCCH) used for conveying SL HARQ feedback are indicated in Downlink Control Information (DCI) (as discussed in 3GPP R1-1913275). In one embodiment, the DCI could deliver the dynamic SL grant. The DCI could also deliver activation of type-2 configured SL grant. Furthermore, the DCI could deliver the dynamic SL grant for providing sidelink retransmission resource(s). In one embodiment, the sidelink retransmission resources may be associated with an initial transmission of a Transport Block (TB) scheduled by a dynamic grant or a configured grant (type-1 or type-2). One combination of "timing and resource for PUCCH" in the DCI may be used to indicate that PUCCH resource is not provided (as discussed in the Draft Report of 3GPP TSG RAN WG1 #99).

For type-1 configured SL grant, Radio Resource Control (RRC) is used to configure the timing and resource of the PUCCH (as discussed in 3GPP R1-1913275). If there is no RRC configuration of PUCCH resources, it may mean to indicate that PUCCH resource is not provided (as discussed in the Draft Report of 3GPP TSG RAN WG1 #99).

Currently, for a UE configured in network scheduling mode, the network node can provide resource pool configuration and provide PUCCH resource for reporting SL HARQ feedback. However, if the network node schedules sidelink resource(s) in a resource pool without PSFCH resources, and if the TX UE performs sidelink data transmission(s) in the sidelink resource(s) in the resource pool, the TX UE cannot acquire SL HARQ feedback from RX UE. Thus, the TX UE may perform the sidelink transmission(s) for delivering data with SL HARQ feedback disabled. In this case, if the network node provides PUCCH resource associated with the sidelink resource(s), it is questionable how the TX UE reports SL HARQ feedback to the network node. To address this issue, there are some methods/embodiments are discussed below:

Method a

A first device may receive a SL grant, wherein the SL grant schedules/indicates at least a sidelink resource. In one embodiment, the SL grant may indicate a PUCCH resource. The PUCCH resource may be associated with the sidelink resource or the SL grant. In one embodiment, the sidelink resource may be comprised within a sidelink resource pool. The sidelink resource pool may be configured with no PSFCH resource.

Alternatively, there may be no PSFCH configuration for the sidelink resource pool. The SL HARQ feedback could be disabled in the sidelink resource pool. It (e.g. no PSFCH or SL HARQ feedback disable) may be due to Channel Busy Ratio (CBR) of the sidelink resource pool being higher than a threshold. Preferably or alternatively, it (e.g. no PSFCH or SL HARQ feedback disable) may be (pre-)configured for the sidelink resource pool.

The first device may perform a sidelink transmission on the sidelink resource to at least a second device. The sidelink transmission may comprise, include, or deliver at least a data packet.

The general concept of Method a is that in this case, the first device may still report SL HARQ feedback via the PUCCH resource to network node, even though the first device does not receive SL HARQ feedback from at least the second device. In one embodiment, the first device may determine or derive how to report SL HARQ feedback. The first device may report SL HARQ feedback via the PUCCH resource after performing the sidelink transmission.

Embodiment 1

In one embodiment, the first device may (always) report SL HARQ feedback as ACK. In other words, even though the first device does not receive SL HARQ feedback from at least the second device, the first device could still report SL HARQ feedback as ACK to the network node.

In this embodiment, the network node may not transmit another SL grant for retransmission of the data packet. Alternatively, the network node may transmit another SL grant for retransmission of the data packet. Even though the network node cannot know whether the data packet is delivered successfully to at least the second device, the network node may assume or determine a number of (re-)transmissions of the data packet. In one embodiment, if network node knows that the sidelink (re-)transmission on the sidelink resource does not exceed the number, the network node can transmit another SL grant for retransmission of the data packet. If network node knows that the sidelink (re-)transmission on the sidelink resource is the last time retransmission of the data packet, the network node may not transmit another SL grant for retransmission of the data packet.

In this embodiment, one aspect is that SL HARQ report from the first device to the network node may be considered as confirmation that the first device receives the SL grant and utilize the scheduled/indicated sidelink resource. The network node may be responsible to take care of the number of (re-)transmission of the data packet. Moreover, if the network node does not receive or detect ACK via the PUCCH resource or if the network node does not detect any transmission via the PUCCH resource (e.g. DTX), the network node may transmit another SL grant for retransmission of the data packet.

Embodiment 2

In one embodiment, the first device may (always) report SL HARQ feedback as NACK. In other words, even though the first device does not receive SL HARQ feedback from at least the second device, the first device still reports SL HARQ feedback as NACK to the network node.

In this embodiment, the network node may not transmit another SL grant for retransmission of the data packet. Alternatively, the network node may transmit another SL grant for retransmission of the data packet. Even though the network node cannot know whether the data packet is delivered successfully to at least the second device, the network node may assume or determine a number of (re-)transmissions of the data packet. In one embodiment, if network node knows that the sidelink (re-)transmission on the sidelink resource does not exceed the number, the network node can transmit another SL grant for retransmission of the data packet. If network node knows that the sidelink (re-)transmission on the sidelink resource is the last time retransmission of the data packet, the network node does not transmit another SL grant for retransmission of the data packet.

In this embodiment, one general aspect is that SL HARQ report from the first device to the network node may be considered as confirmation that the first device receives the SL grant and utilize the scheduled or indicated sidelink resource. The network node is responsible to take care of the number of (re-)transmission of the data packet. Moreover, if the network node does not receive or detect NACK via the PUCCH resource or if the network node does not detect any transmission via the PUCCH resource (e.g. DTX), the network node may transmit another SL grant for retransmission of the data packet.

Embodiment 3

In one embodiment, even though the first device does not receive SL HARQ feedback from at least the second device, the first device could (autonomously) determine or derive SL HARQ feedback for reporting to the network node. In one embodiment, when the first device generates a data packet, the first device may determine or derive a (maximum or allowable) number of times that the data packet can be (re-)transmitted. The first device may perform the sidelink transmission on the sidelink resource, wherein the sidelink transmission delivers, includes, or comprises the data packet. If the sidelink transmission on the sidelink resource is the last time that the data packet can be (re-)transmitted, the first device could report SL HARQ feedback as ACK via the PUCCH resource. If the sidelink transmission on the sidelink resource is not the last time that the data packet can be (re-)transmitted, the first device could report SL HARQ feedback as NACK via the PUCCH resource. In one embodiment, if the sidelink transmission on the sidelink resource does not exceed the number of times that the data packet can be (re-)transmitted, and/or if the sidelink transmission is not the last time that the data packet can be (re-)transmitted, the first device could report SL HARQ feedback as NACK via the PUCCH resource.

In this embodiment, if network node receives or detects ACK via the PUCCH resource, the network node may not transmit another SL grant for retransmission of the data packet. If network node receives or detects NACK via the PUCCH resource, the network node may transmit another SL grant for retransmission of the data packet.

In one embodiment, the number of times may be derived based on priority of the data packet. The number of times may also be derived based on a logical channel priority, wherein the data packet comprises data belonging to the logical channel. If the data packet comprises (only) Medium Access Control (MAC) Control Element (CE), the number of times may be associated with the MAC CE. If the data packet comprises data belonging to more than one logical channel (or MAC CE), the number of times may be derived base on the logical channel with highest priority within the more than one logical channel (or based on the MAC CE).

Alternatively, if the data packet comprises data belonging to more than one logical channel (or MAC CE), the number of times may be derived base on the logical channel with largest number of times within the more than one logical channel (or based on the MAC CE). Alternatively, if the data packet comprises data belonging to more than one logical channel (or MAC CE), wherein each logical channel may be associated with one number (or the MAC CE is associated with one number), the number of times may be derived based on the largest number among the more than one number associated with the more than one logical channel (or the one number associated with the MAC CE).

In one embodiment, when the first device receives a SL grant scheduling at least a sidelink resource, the SL grant could indicate a PUCCH reporting timing (e.g. slot) by a time offset field. Based on the indicated time offset, the first device may derive a timing (e.g. slot) to transmit the PUCCH delivering SL HARQ feedback associated to the sidelink resource or the SL grant. The SL grant could provide a (valid or available) PUCCH resource for reporting SL HARQ feedback to the network node.

In one embodiment, if the sidelink resource pool is (pre-)configured with PSFCH resource, the first device may consider that the time offset is from PSFCH to PUCCH, i.e. PSFCH to PUCCH. If the sidelink resource pool is (pre-)configured with no PSFCH resource, the first device may consider that the time offset is replaced from "PSFCH to PUCCH" to "PSSCH or PSCCH to PUCCH" or "PDCCH to PUCCH". In one embodiment, PSSCH or PSCCH may be the channel and/or the sidelink resource scheduled by the SL grant. PDCCH could be the channel delivering the SL grant. In one embodiment, the time offset could be by counting from physical slots. The counting slot could be determined based on uplink slot numerology or subcarrier spacing (SCS).

Method b

The general concept of Method b is for network node to restrict some combination of configurations. In one embodiment, the network node may transmit, deliver, configure, or schedule a SL grant to a first device, wherein the SL grant schedules or indicates at least a sidelink resource. The sidelink resource may be comprised within a sidelink resource pool.

In one embodiment, if the sidelink resource pool is configured with no PSFCH resource, the network node shall not provide PUCCH resource associated with the sidelink resource or the SL grant. The network node (is restricted to) excludes, precludes, or prevents from providing a PUCCH resource associated with the sidelink resource or the SL grant.

Alternatively, if there is no PSFCH configuration for the sidelink resource pool, the network node shall not provide PUCCH resource associated with the sidelink resource or the SL grant. The network node (is restricted to) excludes, precludes, or prevents from providing a PUCCH resource associated with the sidelink resource or the SL grant. In other words, if the network node schedules, assigns, or configures the sidelink resource, to the first device, in a sidelink resource pool without PSFCH resources, the network node shall not provide PUCCH resource, for reporting SL HARQ, to the first device. The network node (is restricted to) excludes, precludes, or prevents from providing a PUCCH resource, for reporting SL HARQ, to the first device.

In one embodiment, the SL grant may only indicate or may only be allowed to indicate a combination or codepoint indicating no PUCCH resource. Accordingly, the first device could perform a sidelink transmission on the sidelink resource to at least a second device, and the first device may not report SL HARQ feedback to the network node (after performing the sidelink transmission) since the first device cannot acquire SL HARQ feedback from at least the second device.

From the perspective of the first device, if the first device receives a SL grant scheduling the sidelink resource in a sidelink resource pool without PSFCH resources, the first device may assume, expect, or consider that the SL grant does not provide PUCCH resource for reporting SL HARQ feedback. The first device may not be expected or may not expect to receive the SL grant providing a PUCCH resource associated to the scheduled sidelink resource in a sidelink resource pool without PSFCH resource. The first device may not be expected or may not expect to receive the SL grant providing a PUCCH resource and scheduling sidelink resource in a sidelink resource pool without PSFCH resource.

In one embodiment, if the SL grant provides PUCCH resource for reporting SL HARQ feedback associated with a sidelink resource in a sidelink resource pool without PSFCH resources, the first device may ignore the PUCCH-related field in the SL grant. If the SL grant schedules a sidelink resource in a sidelink resource pool without PSFCH resources and the SL grant provides PUCCH resource for reporting SL HARQ feedback associated with the sidelink resource or the SL grant, the first device may ignore the PUCCH-related field in the SL grant.

Alternatively, if the SL grant provided PUCCH resource for reporting SL HARQ feedback associated with a sidelink resource in a sidelink resource pool without PSFCH resources, the first device may consider the SL grant is an inconsistent scheduling and/or drop the SL grant. If the SL grant schedules a sidelink resource in a sidelink resource pool without PSFCH resources and the SL grant provides PUCCH resource for reporting SL HARQ feedback associated with the sidelink resource or the SL grant, the first device may consider the SL grant is an inconsistent scheduling and/or drop the SL grant. If the first device drops the SL grant, the first device may not perform sidelink transmission on the sidelink resource scheduled by the SL grant.

In one embodiment, if a DCI delivers or schedules the SL grant, one (codepoint) combination or one codepoint of field(s) in the DCI may be used to indicate that PUCCH resource is not provided. Other combinations or other codepoints of the field(s) may be used for indicating timing or resource for PUCCH. If RRC delivers or configure the SL grant, the configuration for the SL grant may not include PUCCH resource configuration. The configuration for the SL grant may not indicate timing and resource of PUCCH resource for reporting SL HARQ feedback. It could mean that PUCCH resource may not be provided for the SL grant.

For All Above Concepts, Methods, Alternatives and Embodiments

Any of above methods, alternatives and embodiments may be combined or applied simultaneously.

In one embodiment, the SL grant may be a dynamic SL grant. The timing and resource of PUCCH resource used for reporting SL HARQ feedback may be indicated, scheduled, or assigned in a DCI (downlink control information). One (codepoint) combination or one codepoint of field(s) in the DCI may be used to indicate that PUCCH resource is not provided. Other combinations or other codepoints of the field(s) may be used for indicating timing and/or resource for PUCCH.

In one embodiment, the DCI could deliver a dynamic SL grant. The DCI could be scrambled using SL RNTI introduced for DCI for a dynamic SL grant. The DCI could deliver a dynamic SL grant for providing sidelink retransmission resource(s), which is associated with an initial transmission of a TB scheduled by a dynamic SL grant. The DCI could be scrambled using SL RNTI introduced for DCI for a dynamic SL grant. In one embodiment, the DCI could deliver a dynamic SL grant for providing sidelink retransmission resource(s), which is associated with an initial transmission of a TB scheduled by a (type-1 or type-2) configured SL grant. The DCI could be scrambled using SL Radio Network Temporary Identifier (RNTI) introduced for DCI for a type-2 configured SL grant.

In one embodiment, the SL grant may be a type-2 configured SL grant. The timing and resource of PUCCH resource used for reporting SL HARQ feedback may be indicated, scheduled or assigned in a DCI. One (codepoint) combination or one codepoint of field(s) in the DCI may be used to indicate that PUCCH resource is not provided. Other combinations or other codepoints of the field(s) may be used for indicating timing or resource for PUCCH.

In one embodiment, the DCI could deliver the activation of the type-2 configured SL grant. The DCI could be scrambled using SL RNTI introduced for DCI for a type-2configured SL grant.

In one embodiment, the DCI could deliver a dynamic SL grant for providing sidelink retransmission resource(s), which is associated with an initial transmission of a TB scheduled by the type-2 configured SL grant. The DCI could be scrambled using SL RNTI introduced for DCI for a type-2configured SL grant.

In one embodiment, the SL grant may be a type-1 configured SL grant. The timing and resource of PUCCH resource used for reporting SL HARQ feedback could be indicated or configured in RRC signaling. If the configuration for the type-1 configured SL grant does not include PUCCH resource configuration, PUCCH resource may not be provided for the type-1 configured SL grant. If the configuration for the type-1 configured SL grant does not indicate timing and resource of PUCCH resource for reporting SL HARQ feedback, PUCCH resource may not be provided for the type-1 configured SL grant.

In one embodiment, the another SL grant could indicate a same HARQ ID as the SL grant. The another SL grant could also indicate a non-toggled NDI value as the SL grant. The another SL grant could be scrambled using SL RNTI introduced for DCI for a dynamic SL grant.

In one embodiment, the another SL grant could indicate a NDI value as 1. The another SL grant could be scrambled using the SL RNTI introduced for DCI for a type-2configured SL grant.

In one embodiment, the first device may have, maintain, or establish a sidelink link or connection with the second device. The more than one sidelink logical channel may be associated with the second device or associated with the sidelink link or connection.

In one embodiment, the sidelink resource may be utilized for sidelink transmission, reception, or communication of the sidelink link or connection. The sidelink link or connection may be a unicast link or connection. The second device could be the paired device of the first device. The sidelink link or connection may also be a groupcast link or connection. The first device and the second device may be within a same sidelink group. The sidelink link or connection may be a broadcast link or connection. The second device may be a neighboring device around the first device.

In one embodiment, the first device may perform sidelink transmission, reception, or communication of the sidelink link or connection in the sidelink resource pool. The first device may also perform sidelink transmission, reception, or communication of the sidelink link or connection associated with network scheduling mode (e.g. NR SL mode 1).

In one embodiment, the network node may be a gNB, a base station, or a Roadside Unit (RSU) (i.e., a network-type RSU or a UE-type RSU). The network node may be replaced or represented by a specific device within a sidelink group.

In one embodiment, the logical channel may mean sidelink logical channel. The data comprised in the data packet may come from at least a sidelink logical channel. The MAC CE comprised in the data packet could be utilized for the sidelink link or connection.

In one embodiment, the data packet could be a sidelink data packet. The data packet may comprise data belonging to sidelink logical channel. The data packet may comprise sidelink MAC CE. The data packet may not comprise data belonging to Uu-interface logical channel. The data packet may not comprise Uu-interface MAC CE.

In one embodiment, the sidelink transmission may be PSSCH or PSCCH.

In one embodiment, the sidelink slot may mean slot for sidelink. A sidelink slot may be represented as a Transmission Time Interval (TTI). A TTI may be a subframe (for sidelink). A TTI may comprise multiple symbols, e.g. 12 or 14 symbols. The TTI may be a slot (fully/partially) comprising sidelink symbols. The TTI may mean a transmission time interval for a sidelink (data) transmission.

In one embodiment, a sidelink slot or a slot for sidelink may contain all Orthogonal Frequency Division Multiplexing (OFDM) symbols available for sidelink transmission. A sidelink slot or a slot for sidelink may contain a consecutive number symbols available for sidelink transmission. A sidelink slot or a slot for sidelink may mean that a slot is included in a sidelink resource pool. The symbol may mean a symbol indicated or configured for sidelink.

In one embodiment, a sub-channel may be a unit for sidelink resource allocation or scheduling (for PSSCH). A sub-channel may comprise multiple contagious PRBs in frequency domain. The number of PRBs for each sub-channel may be (pre-)configured for a sidelink resource pool. A sidelink resource pool (pre-)configuration may indicate or configure the number of PRBs for each sub-channel. The number of PRBs for each sub-channel may be any of 4, 5, 6, 8, 9, 10, 12, 15, 16, 18, 20, 25, 30, 48, 50, 72, 75, 96, or 100.

In one embodiment, a sub-channel may be represented as a unit for sidelink resource allocation or scheduling. A sub-channel may mean a PRB. A sub-channel may mean a set of consecutive PRBs in frequency domain. A sub-channel may mean a set of consecutive resource elements in frequency domain.

In one embodiment, the SL HARQ feedback may comprise ACK or NACK. The SL HARQ feedback for a data packet from the second device to the first device may be derived based on whether the second device successfully receives or decodes the data packet delivered in the associated sidelink (re)transmission from the first device.

In one embodiment, a data packet may mean a TB. A data packet may mean a MAC PDU. A data packet may mean one or two TB(s) delivered or included in one sidelink (re) transmission.

In one embodiment, the sidelink transmission or reception may be device-to-device transmission or reception, V2X transmission or reception, or P2X transmission or reception. The sidelink transmission or reception may be on PC5 interface.

In one embodiment, the PC5 interface may be wireless interface for communication between device and device. The PC5 interface may be wireless interface for communication between devices. The PC5 interface may be wireless interface for communication between UEs. The PC5 interface may be wireless interface for V2X or P2X communication.

In one embodiment, the Uu interface may be wireless interface for communication between network node and device. The Uu interface may be wireless interface for communication between network node and UE.

In one embodiment, the first device and the second device are different devices. The first device may be a UE, a vehicle UE, a V2X UE, or a transmitting UE.

In one embodiment, the second device may be a UE. In particular, the second device may be a vehicle UE, a V2X UE, or a receiving UE.

In one embodiment, PUCCH could be replaced by PUSCH (when the first device receives an uplink grant scheduling the PUSCH on the same slot as the PUCCH). In this case, the first device may report SL HARQ feedback via the PUSCH resource in the same slot, instead of via the PUCCH resource.

Figure 9:
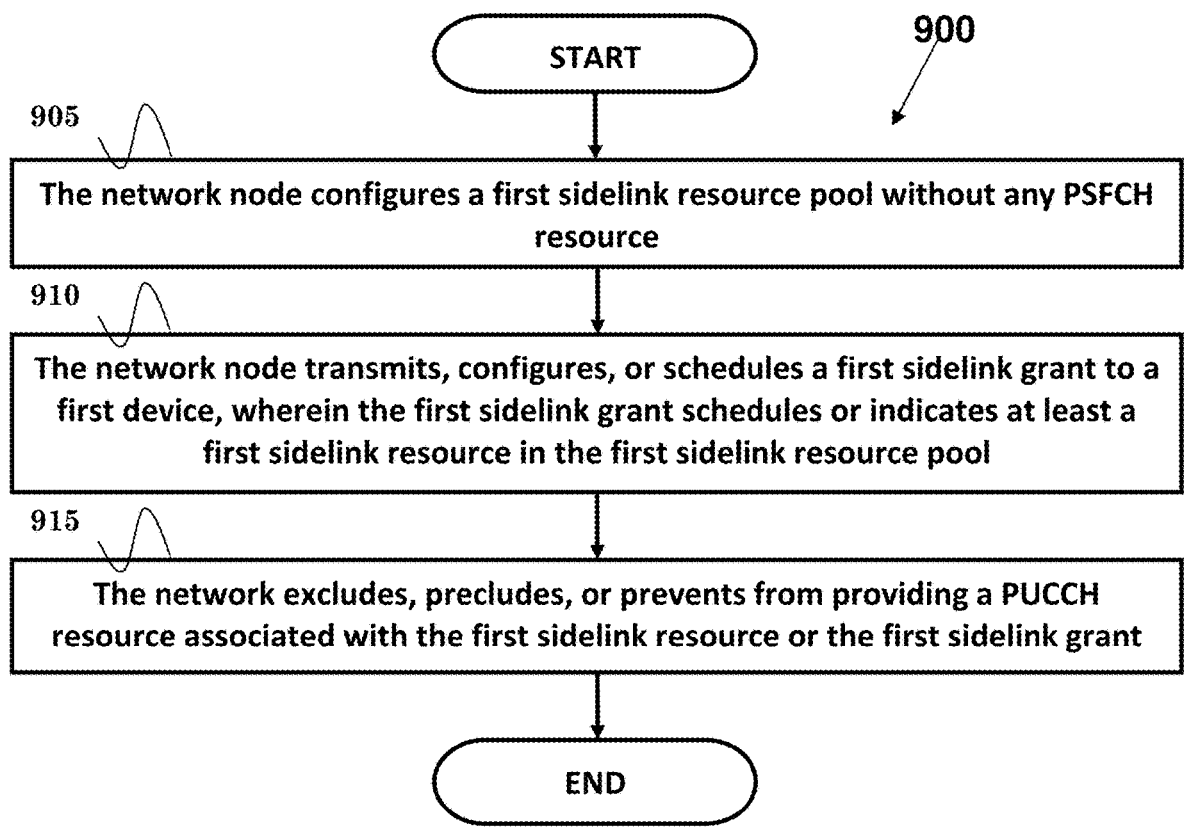
FIG. 9 is a flow chart according to one exemplary embodiment.

FIG. 9 is a flow chart 900 according to one exemplary embodiment from the perspective of a network node to schedule sidelink resources. In step 905, the network node configures a first sidelink resource pool without any PSFCH resource. In step 910, the network node transmits, configures, or schedules a first sidelink grant to a first device, wherein the first sidelink grant schedules or indicates at least a first sidelink resource in the first sidelink resource pool. In step 915, the network excludes, precludes, or prevents from providing a PUCCH resource associated with the first sidelink resource or the first sidelink grant.

In one embodiment, the first sidelink grant may be transmitted or scheduled via a DCI, wherein one (codepoint)

combination or one codepoint of field(s) in the DCI is set to indicate that PUCCH resource is not provided, and/or the first sidelink grant may only indicate or may be only allowed to indicate the one combination or the one codepoint of field(s) indicating that PUCCH resource is not provided. Furthermore, the first sidelink grant could be transmitted or configured via RRC signaling, wherein the configuration for the first sidelink grant does not include or provide PUCCH resource configuration.

In one embodiment, the network node could configure a second sidelink resource pool with PSFCH resource. Furthermore, the network node could transmit, configure, or schedule a second sidelink grant to a second device, wherein the second sidelink grant schedules or indicates at least a second sidelink resource in the second sidelink resource pool. In addition, the network node could be allowed to provide a PUCCH resource associated with the second sidelink resource or the second sidelink grant. In one embodiment, the PUCCH resource is for the first device to report SL HARQ feedback associated with corresponding sidelink resource or corresponding sidelink grant.

Referring back to FIGS. 3 and 4, in one exemplary embodiment of a network node to schedule sidelink resources. The network node 300 includes a program code 312 stored in the memory 310. The CPU 308 could execute program code 312 to enable the network node (i) to configure a first sidelink resource pool without any PSFCH resource, (ii) to transmit, configure, or schedule a first sidelink grant to a first device, wherein the first sidelink grant schedules or indicates at least a first sidelink resource in the first sidelink resource pool, and (iii) to exclude, preclude, or prevent from providing a PUCCH resource associated with the first sidelink resource or the first sidelink grant. Furthermore, the CPU 308 can execute the program code 312 to perform all of the above-described actions and steps or others described herein.

Figure 10:
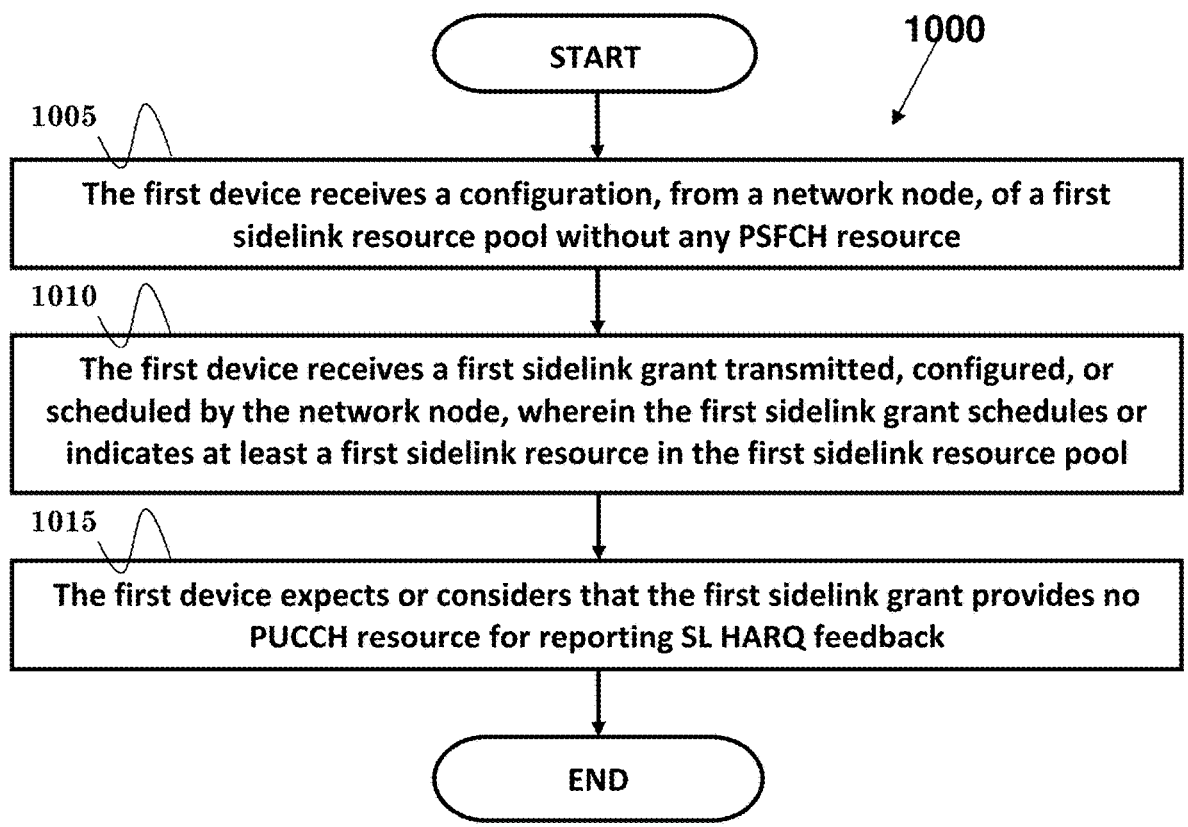
FIG. 10 is a flow chart according to one exemplary embodiment.

FIG. 10 is a flow chart 1000 according to one exemplary embodiment from the perspective of a first device. In step 1005, the first device receives a configuration, from a network node, of a first sidelink resource pool without any PSFCH resource. In step 1010, the first device receives a first sidelink grant transmitted, configured, or scheduled by the network node, wherein the first sidelink grant schedules or indicates at least a first sidelink resource in the first sidelink resource pool. In step 1015, the first device expects or considers that the first sidelink grant provides no PUCCH resource for reporting SL HARQ feedback.

In one embodiment, the first sidelink grant could be transmitted or scheduled via a DCI, wherein one (codepoint) combination or one codepoint of field(s) in the DCI is set to indicate that PUCCH resource is not provided, and/or the first sidelink grant could only indicate or could be only allowed to indicate the one combination or the one codepoint of field(s) indicating that PUCCH resource is not provided.

In one embodiment, the first sidelink grant could be transmitted or configured via RRC signaling, wherein the configuration for the first sidelink grant does not include or provide PUCCH resource configuration. If the first sidelink grant provided PUCCH resource for reporting SL HARQ feedback associated with the first sidelink resource or the first sidelink grant, the first device could consider the first sidelink grant is an inconsistent scheduling and/or drop the first sidelink grant. If the first device drops the first sidelink grant, the first device may not perform sidelink transmission on the first sidelink resource scheduled by the first sidelink grant.

Referring back to FIGS. 3 and 4, in one exemplary embodiment of a first device. The first device 300 includes a program code 312 stored in the memory 310. The CPU 308 could execute program code 312 to enable the first device (i) to receive a configuration, from a network node, of a first sidelink resource pool without any PSFCH resource, (ii) to receive a first sidelink grant transmitted, configured, or scheduled by the network node, wherein the first sidelink grant schedules or indicates at least a first sidelink resource in the first sidelink resource pool, and (iii) to expect or consider that the first sidelink grant provides no PUCCH resource for reporting SL HARQ feedback. Furthermore, the CPU 308 can execute the program code 312 to perform all of the above-described actions and steps or others described herein.

Figure 11:
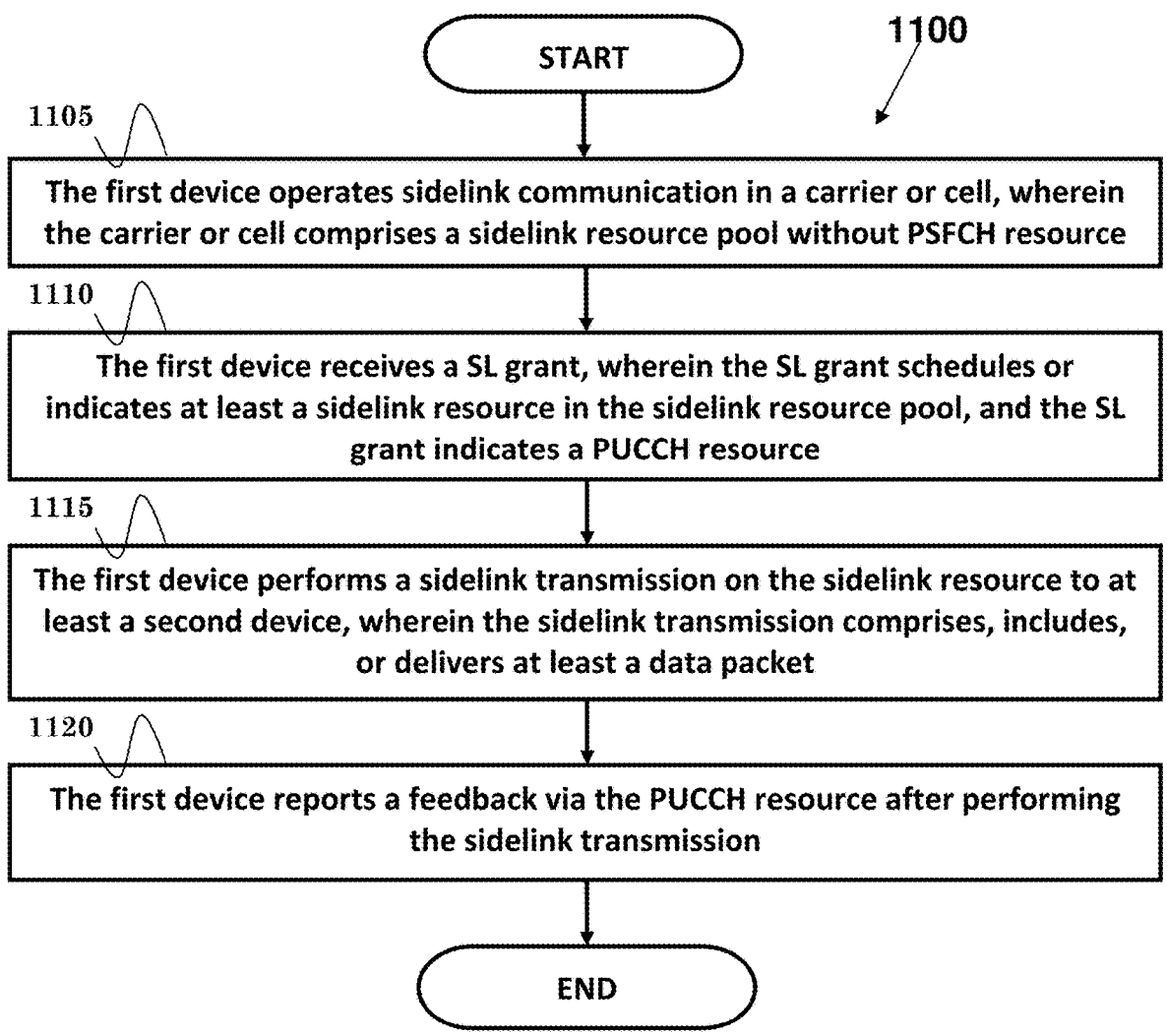
FIG. 11 is a flow chart according to one exemplary embodiment.

FIG. 11 is a flow chart 1100 according to one exemplary embodiment from the perspective of a first device to perform sidelink communication. In step 1105, the first device operates sidelink communication in a carrier or cell, wherein the carrier or cell comprises a sidelink resource pool without PSFCH resource. In step 1110, the first device receives a SL grant, wherein the SL grant schedules or indicates at least a sidelink resource in the sidelink resource pool, and the SL grant indicates a PUCCH resource. In step 1115, the first device performs a sidelink transmission on the sidelink resource to at least a second device, wherein the sidelink transmission comprises, includes, or delivers at least a data packet. In step 1120, the first device reports a feedback via the PUCCH resource after performing the sidelink transmission.

In one embodiment, the PUCCH resource could be associated with the sidelink resource or the SL grant. The first device may not receive SL HARQ feedback from at least the second device. The first device may (always) report the feedback as ACK. Alternatively, the first device may (always) report the feedback as NACK.

In one embodiment, the first device could determine or derive a (maximum or allowable) number of times that the data packet can be (re-)transmitted. If the sidelink transmission on the sidelink resource is the last time that the data packet can be (re-)transmitted, the first device could report SL HARQ feedback as ACK via the PUCCH resource. If the sidelink transmission on the sidelink resource is not the last time that the data packet can be (re-) transmitted, the first device could report SL HARQ feedback as NACK via the PUCCH resource.

In one embodiment, the number of times could be derived based on a sidelink logical channel priority, wherein the data packet comprises data belonging to the sidelink logical channel. If the data packet comprises (only) MAC CE, the number of times could be associated with the MAC CE.

Referring back to FIGS. 3 and 4, in one exemplary embodiment of a first device to perform sidelink communication. The first device 300 includes a program code 312 stored in the memory 310. The CPU 308 could execute program code 312 to enable the first device (i) to operate sidelink communication in a carrier or cell, wherein the carrier or cell comprises a sidelink resource pool without PSFCH resource, (ii) to receive a SL grant, wherein the SL grant schedules or indicates at least a sidelink resource in the sidelink resource pool, and the SL grant indicates a PUCCH resource, (iii) to perform a sidelink transmission on the sidelink resource to at least a second device, wherein the sidelink transmission comprises, includes, or delivers at least a data packet, and (iv) to report a feedback via the PUCCH resource after performing the sidelink transmission.

Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a network node to schedule New Radio (NR) sidelink resources, comprising:
   the network node configures a first NR sidelink resource pool, wherein the first NR sidelink resource pool is configured with no Physical Sidelink Feedback Channel (PSFCH) resource, and wherein PSFCH resource is used for transmitting sidelink HARQ feedback between devices;
   the network node transmits, configures, or schedules a first sidelink grant to a first device, wherein the first sidelink grant schedules or indicates at least a first NR sidelink resource in the first NR sidelink resource pool; and
   the network excludes, precludes, or prevents, based on the first NR sidelink resource pool being configured with no PSFCH resource, from providing a Physical Uplink Control Channel (PUCCH) resource associated with the first NR sidelink resource or the first sidelink grant.

2. The method of claim 1, wherein the first sidelink grant is transmitted or scheduled via a Downlink Control Information (DCI), wherein one combination or one codepoint of field(s) in the DCI is set to indicate that PUCCH resource is not provided, and/or
the first sidelink grant only indicates or is only allowed to indicate the one combination or the one codepoint of field(s) indicating that PUCCH resource is not provided.

3. The method of claim 1, wherein the first sidelink grant is transmitted or configured via Radio Resource Control (RRC) signaling, wherein the configuration for the first sidelink grant does not include or provide PUCCH resource configuration.

4. The method of claim 1, further comprising:
the network node configures a second NR sidelink resource pool with PSFCH resource;
the network node transmits, configures, or schedules a second sidelink grant to a second device, wherein the second sidelink grant schedules or indicates at least a second NR sidelink resource in the second NR sidelink resource pool; and
the network node is allowed to provide a PUCCH resource associated with the second NR sidelink resource or the second sidelink grant.

5. The method of claim 1, wherein the first NR sidelink resource pool, without any PSFCH resources, includes a PSFCH periodicity configuration of the first NR sidelink resource pool that indicates no resources for PSFCH.

6. A network node to schedule New Radio (NR) sidelink resources, comprising:
a processor; and
a memory operatively coupled to the processor, wherein the processor is configured to execute a program code to:
configure a first NR sidelink resource pool, wherein the first NR sidelink resource pool is configured with no Physical Sidelink Feedback Channel (PSFCH) resource, and wherein PSFCH resource is used for transmitting sidelink HARQ feedback between devices;
transmit, configure, or schedule a first sidelink grant to a first device, wherein the first sidelink grant schedules or indicates at least a first NR sidelink resource in the first NR sidelink resource pool; and
exclude, preclude, or prevent, based on the first NR sidelink resource pool being configured with no PSFCH resource, from providing a Physical Uplink Control Channel (PUCCH) resource associated with the first NR sidelink resource or the first sidelink grant.

7. The network node of claim 6, wherein the first sidelink grant is transmitted or scheduled via a Downlink Control Information (DCI), wherein one combination or one codepoint of field(s) in the DCI is set to indicate that PUCCH resource is not provided, and/or
the first sidelink grant only indicates or is only allowed to indicate the one combination or the one codepoint of field(s) indicating that PUCCH resource is not provided.

8. The network node of claim 6, wherein the first sidelink grant is transmitted or configured via Radio Resource Control (RRC) signaling, wherein the configuration for the first sidelink grant does not include or provide PUCCH resource configuration.

9. The network node of claim 6, wherein the processor is further configured to execute a program code stored in the memory to:
configure a second NR sidelink resource pool with PSFCH resource;
transmit, configure, or schedule a second sidelink grant to a second device, wherein the second sidelink grant schedules or indicates at least a second NR sidelink resource in the second sidelink NR resource pool; and
be allowed to provide a PUCCH resource associated with the second NR sidelink resource or the second sidelink grant.

10. A method of a first device, comprising:
the first device receives a configuration, from a network node, of a first New Radio (NR) sidelink resource pool, wherein the first NR sidelink resource pool is configured with no Physical Sidelink Feedback Channel (PSFCH) resource, and wherein PSFCH resource is used for transmitting sidelink HARQ feedback between devices;
the first device receives a first sidelink grant transmitted, configured, or scheduled by the network node, wherein the first sidelink grant schedules or indicates at least a first NR sidelink resource in the first sidelink NR resource pool; and
the first device expects or considers, based on the first NR sidelink resource pool being configured with no PSFCH resource, that the first sidelink grant provides no Physical Uplink Control Channel (PUCCH) resource for reporting Sidelink (SL) Hybrid Automatic Repeat Request (HARQ) feedback to the network node.

11. The method of claim 10, wherein the first sidelink grant is transmitted or scheduled via a Downlink Control Information (DCI), wherein one combination or one codepoint of field(s) in the DCI is set to indicate that PUCCH resource is not provided, and/or
the first sidelink grant only indicates or is only allowed to indicate the one combination or the one codepoint of field(s) indicating that PUCCH resource is not provided.

12. The method of claim 10, wherein the first sidelink grant is transmitted or configured via Radio Resource Control (RRC) signaling, wherein the configuration for the first sidelink grant does not include or provide PUCCH resource configuration.

13. The method of claim 10, wherein if the first sidelink grant provided PUCCH resource for reporting SL HARQ feedback associated with the first NR sidelink resource or the first sidelink grant, the first device considers the first sidelink grant is an inconsistent scheduling and/or drop the first sidelink grant.

14. The method of claim 13, wherein if the first device drops the first sidelink grant, the first device does not perform sidelink transmission on the first NR sidelink resource scheduled by the first sidelink grant.

15. The method of claim 10, wherein the configuration of the first NR sidelink resource pool, without any PSFCH resources, includes a PSFCH periodicity configuration of the first NR sidelink resource pool that indicates no resources for PSFCH.

16. A first device, comprising:
a processor; and
a memory operatively coupled to the processor,
wherein the processor is configured to execute a program code to:
receive a configuration, from a network node, of a first New Radio (NR) sidelink resource pool, wherein the first NR sidelink resource pool is configured with no Physical Sidelink Feedback Channel (PSFCH) resource, and wherein PSFCH resource is used for transmitting sidelink HARQ feedback between devices;

receive a first sidelink grant transmitted, configured, or scheduled by the network node, wherein the first sidelink grant schedules or indicates at least a first NR sidelink resource in the first NR sidelink resource pool; and expect or consider, based on the first NR sidelink resource pool being configured with no PSFCH resource, that the first sidelink grant provides no Physical Uplink Control Channel (PUCCH) resource for reporting Sidelink (SL) Hybrid Automatic Repeat Request (HARQ) feedback to the network node.

17. The first device of claim 16, wherein the first sidelink grant is transmitted or scheduled via a Downlink Control Information (DCI), wherein one combination or one codepoint of field(s) in the DCI is set to indicate that PUCCH resource is not provided, and/or the first sidelink grant only indicates or is only allowed to indicate the one combination or the one codepoint of field(s) indicating that PUCCH resource is not provided.

18. The first device of claim 16, wherein the first sidelink grant is transmitted or configured via Radio Resource Control (RRC) signaling, wherein the configuration for the first sidelink grant does not include or provide PUCCH resource configuration.

19. The first device of claim 16, wherein if the first sidelink grant provided PUCCH resource for reporting SL HARQ feedback associated with the first NR sidelink resource or the first sidelink grant, the first device considers the first sidelink grant is an inconsistent scheduling and/or drop the first sidelink grant.

20. The first device of claim 19, wherein if the first device drops the first sidelink grant, the first device does not perform sidelink transmission on the first NR sidelink resource scheduled by the first sidelink grant.

* * * * *